United States Patent [19]
Mullhaupt et al.

[11] Patent Number: 5,945,079
[45] Date of Patent: Aug. 31, 1999

[54] OXYGEN-SELECTIVE SORBENTS

[75] Inventors: Joseph Timothy Mullhaupt, Williamsville; Neil Andrew Stephenson; Paula Chinn Stephenson, both of Clarence Center, all of N.Y.

[73] Assignee: Praxair Technology, Inc., Danbury, Conn.

[21] Appl. No.: 08/994,129

[22] Filed: Dec. 19, 1997

Related U.S. Application Data

[62] Division of application No. 08/814,165, Mar. 10, 1997, abandoned, which is a continuation of application No. 08/339,872, Nov. 14, 1994, abandoned.

[51] Int. Cl.$^6$ .................................................. C01B 13/00
[52] U.S. Cl. ............................................................ 423/219
[58] Field of Search ............................. 423/219; 502/400, 502/401, 402, 405, 406, 407, 415, 416, 514, 523

[56] References Cited

U.S. PATENT DOCUMENTS

| | | | |
|---|---|---|---|
| 4,343,715 | 8/1982 | Bonaventura et al. | 252/186 |
| 4,629,544 | 12/1986 | Bonaventura et al. | 204/131 |
| 4,857,599 | 8/1989 | Tomalia et al. | 525/259 |
| 5,096,724 | 3/1992 | Zenner et al. | 426/124 |
| 5,225,174 | 7/1993 | Friesen et al. | 423/235 |

FOREIGN PATENT DOCUMENTS

| | | |
|---|---|---|
| 0475053A1 | 3/1992 | European Pat. Off. . |
| 60-126286 | 7/1985 | Japan . |
| 4029731 | 1/1992 | Japan . |
| WO9404507 | 3/1994 | WIPO . |

OTHER PUBLICATIONS

Jones et al. "Synthetic Oxygen Carriers . . . " *Chemical Reviews* vol. 79 No. 2 pp. 139–179, No month 1979.
Collman "Synthetic Models for the Oxygen–Binding Hemoproteins" *Acc'ts of Chem. Research* vol. 10 pp. 265–272, No month 1977.
Tomalia et al. "Starburst Dendrimers: . . . " *Angew. Chem. Int. Ed. Engl.* vol. 29 pp. 138–175, No month 1990.
Goldsby et al. "Steric Control of Electronic Effects . . . " *Inorganic Chemistry* vol. 26 No. 16 pp. 2651–2656, No month 1987.
D'Souza et al. "Electrochemical and Spectroelectrochemical Behavior . . . " *Inorganic Chemistry* vol. 32 No. 19 pp. 4032–4048, No month 1993.
Collman "Reversible Binding of Dinitrogen and Dioxygen . . . " *J. Amer. Chem. Soc.* vol. 110 No. 11 pp. 3486–3495, No month 1988.
Kadish et al. "Synthesis and Spectroscopic Characterization . . . " *J. Amer. Chem. Soc.* vol. 112 No. 23 pp. 8364–8368, No month 1990.
Leal et al. "Reversible Adsorption of Oxygen . . . " *J. Amer. Chem. Soc.* vol. 97 No. 18 pp. 5125–5129, Sep. 3, 1975.

*Primary Examiner*—Gary P. Straub
*Assistant Examiner*—Timothy C Vanoy
*Attorney, Agent, or Firm*—Robert J. Follett

[57] ABSTRACT

The invention comprises a process for air separation using oxygen-selective sorbents with enhanced selectivity, loading capacities and oxygen uptake rates have a transition element complex in solid form supported on a high surface substrate. The transition element complex is substantially uniformly spaced, and includes a transition element ion accessible to an oxygen-containing gas stream during use in the separation of oxygen from an oxygen-containing gas mixture such as air.

14 Claims, 6 Drawing Sheets

DPy₆

DIm₆

OXYGEN-SELECTIVE SORBENTS

This application is a divisional application of U.S. patent application Ser. No. 08/814,165 which was filed on Mar. 10, 1997, now abandoned, which is a continuation application of U.S. patent application Ser. No. 08/339,872 which was filed on Nov. 14, 1994, now abandoned.

BACKGROUND OF THE INVENTION

1. Field of the Invention

The invention relates to the recovery of oxygen from gas mixtures. More particularly, it relates to oxygen-selective sorbents useful for separating or purifying oxygen-containing gas mixtures.

2. Description of the Prior Art

For many years, air has been separated by cryogenic distillation, for which operating temperatures are set by the vapor-liquid equilibrium of the liquefied mixtures. Air may also be separated by sorption processes that operate at temperatures that are set by the gas-solid equilibrium of the sorbents. Cryogenic separation plants are capital intensive, especially for production rates below several hundred tons per day. More recently, adsorption processes based on nitrogen-selective zeolite adsorbents have been used at such production rates, as well as much lower rates. Considerable progress has been made in reducing product costs for such noncryogenic pressure swing adsorption (PSA)-type processes. However, such nitrogen-selective sorbents are required to handle most of the feed air passed to adsorption processes, and the available selectivities of the nitrogen-selective sorbents impose process restrictions and limit feed separation.

Oxygen-selective sorbents can constitute effective materials for sorption processes that do not require cryogenic temperatures. Such oxygen-selective materials can reduce the size of sorbent inventory required and make possible process cycle simplifications. Oxygen-selective sorbents are especially appropriate for sorption processes that produce nitrogen. Such sorbents, with good sorption capabilities and high selectivities for oxygen, can reduce the cost of non-cryogenic nitrogen production significantly. Oxygen-selective sorbents can lead to lower sorbent inventory, simpler processes with less equipment, and higher purity nitrogen with less power consumption.

It will be appreciated that oxygen-selective sorbents with good sorption capacities and high selectivities can provide attractive alternatives to post-purification techniques for low purity nitrogen and crude argon, presently accomplished by chemisorption on a finely divided metal, such as palladium, or by cryogenic distillation. The chemisorption technique has an added cost factor associated with the requirement for hydrogen to regenerate the chemisorbent. The cryogenic distillation approach requires the use of a large, costly distillation column to remove the oxygen impurity in the post-purification treatment.

Two different classes of oxygen-selective sorbents are known in the art for oxygen separation or removal purposes, said sorbents differing in the mechanism of separation. "Rate-selective" adsorbents discriminate molecules being sorbed based on critical dimension, so that smaller molecules, such as oxygen, adsorb and desorb faster than larger ones, such as nitrogen. Several types of materials exhibit rate selectivity, but oxygen will always be selectively adsorbed in preference to nitrogen. "Equilibrium-selective" sorbents discriminate molecules interacting with them based on equilibrium affinity, leading to either nitrogen or oxygen selectivity. Nitrogen selectivity is observed, for example, for specific physical adsorption on zeolites, such as 5A or 13× molecular sieve material, while oxygen selectivity is observed with mild chemical reactions on numerous cobalt complexes.

With respect to rate-type oxygen-selective sorbents, carbon molecular sieves have been used to produce nitrogen commercially in PSA-type processes since the early 1980's. These adsorbents are amorphous carbons having sharper pore size distributions than most carbons activated for gas adsorption. The preparation and characterization of carbon molecular sieves, as well as processes for their use, are well known and described in the art.

Certain hexacyano compounds, such as $Ce[Fe(CN_6)]$, exhibit rate selectivity for oxygen over nitrogen, and their utility for separating gas mixtures containing oxygen has likewise been described in the art. These hexacyano compounds are crystalline solids that are similar to zeolites in some structural characteristics and adsorptive properties, but the compositions and chemical structures nevertheless differ from those of said zeolites.

Some small-pore zeolites, such as 4A material, exhibit rate-selectivity for oxygen over nitrogen at cycle times shorter than the usual, that is, in seconds rather than minutes. Zeolites with larger pores, on the other hand, e.g. sodium mordenite LP, can be modified chemically to yield rate-selective adsorbents.

With respect to equilibrium-type oxygen-selective sorbents, the reversible reactions of oxygen with condensed materials may be classified into two groups, namely those in which the O=O double bond is broken, and those in which this bond remains intact. Oxygen reaction with oxidic materials are typical of the first group. Examples of such reactions are known with solid oxides and with molten nitrates. Temperatures hundreds of degrees above ambient are required to achieve practical reaction rates in such processing, so that energy recovery is essential, and applications of this equilibrium-type reaction are favored in high temperature processes, e.g. in steel making.

Numerous transition element complexes (TEC's) are known to react reversibly at or below ambient temperatures without breaking the O=O double bond. The use of TEC's to selectively remove oxygen from its mixtures with other gases has been disclosed for solutions of TEC's, for TEC solids or slurries of said solids, for TEC's supported physically on solid supports, for TEC's incorporated in zeolites and for TEC's bound chemically to physical supports. Each of these approaches for the use of TEC's have been beset by one or more of the following problems: (1) insufficient oxygen capacity, (2) slow reaction rates, and (3) decreasing reactivity with time. None of such TEC systems has yet been employed in commercially acceptable embodiments for air separation or oxygen removal from gas stream applications.

The principal disadvantage of rate-selective oxygen sorbents is the pronounced decrease in selectivity encountered over time as a consequence of the operable separation mechanism. Since short processing cycles must be employed with rate-selective sorbents, restrictions are necessarily imposed on the processing cycles that can be employed, limiting the use thereof to higher power requirement cycles than those of equilibrium cycles. For a given adsorbent material, higher selectivities can sometimes be obtained, but at a cost of slower adsorption rates.

The disadvantage of equilibrium-selective oxygen sorbents relate to the temperatures at which they are used and the manner in which they are deployed. Oxygen sorbents of the oxide type require elevated temperatures sufficiently high to obtain practical operating rates without too much loss of adsorptive capacity. The processing cycles employed must be able to cope with the high reaction enthalpies that pertain, and with the side reactions initiated by the high temperatures employed. The availability of equilibrium-type oxygen-selective sorbents that operate near or below ambient temperatures would be desirable in the art, so that such problems associated with high temperature operations could be avoided.

Among the TEC-based products referred to above, those that are used in the liquid phase are found to have a greater potential for deactivation in use than TEC's deployed in the solid phase. In the liquid phase, a given TEC can be attacked and oxidized by a different oxygenated TEC, owing to the mobility of the TEC's. In solutions, the solvent may also deactivate the TEC in several ways. In addition, the use of a solvent imposes further restrictions. Thus, the solvent must have a low vapor pressure, must be safe to use in high oxygen concentrations, and yet must not be too viscous for the desired use.

In light of such factors, solid TEC-based sorbents are of genuine interest in the art. Early attempts to use solid TEC-based sorbents have, however, shown relatively poor performance for a variety of reasons related to the chemistry of TEC's and the characteristics of solid state reactions. Such solid TEC's are expensive sorbents and, in order to maximize their adsorptive capacity, they have sometimes been used without support. However, reactive diffusion in the pure TEC crystals is very slow at their optimum operating temperatures. For crystalline, unsupported TEC's, the critical dimensions of crystals obtained by solvent removal are on the order of micrometers to millimeters. Although the surface layers can react readily, only very small fractions of TEC's occupy said surface layers. As a result, reaction times of many hours are required in order to utilize more than 50% of the TEC's employed in a given application.

In some cases, the TEC's have been deposited physically on common support materials, such as diatomaceous earth, alumina and silica gel. Such efforts have met with little success, because the TEC's have not been properly deployed. Crystallization on low surface area materials, for example on catalyst supports having surface areas of about 50 $m^2/g$, usually produces crystal sizes such as those described above with respect to crystalline, unsupported TEC's. Even if very thin layers are obtained on such low surface area support materials, the adsorptive capacities of the resulting composites are too low for practical commercial operation. On the other hand, physical deposition on high surface area materials, such as adsorbents and the like having surface areas on the order of about 500 $m^2/g$, commonly leads to pore blockage. Since most of the surface area in such high surface area supports is in micropores, typically less than 50 Å, low adsorptive capacities will also result when such high surface area supports are employed. Special techniques are required in order to take advantage of the large internal surface of such high surface area supports. The physical deposition techniques heretofore employed have not been well suited for this task.

In order to disperse the TEC's on the support, efforts have been made to incorporate them in the adsorption cavities of zeolites. In type X zeolites, for example, one TEC per cavity would correspond to a maximum of on the order of 0.5 to 0.6 mmol/g, if all of the TEC's were active. For most TEC's, this is unattainable due to accessibility problems. First, the size of most TEC's relative to the "window" diameters of the zeolites makes it difficult to transport or assemble the TEC's in the zeolite crystal interior. Second, even if all of the cavities were to be occupied, transport of oxygen to those in the interior of the zeolites would be very slow, if it could occur at all.

Another method considered for dispersing TEC's on a solid support is to attach them chemically to specific groups in a polymer chain. The attachment is normally performed by contacting a solution of the TEC with either a dissolved or solvent swollen polymer. With the polymers used so far, poor capacities and/or low reaction rates have been observed. Two types of problems have been identified that have yet to be overcome. First, the high concentrations of attached TEC's needed for practical capacities lead to use of crystalline polymers in which diffusion is very slow. Second, the polymer environment not only retards access of the feed gas mixture to the bound TEC, but can also prevent the TEC from reacting with the feed gas mixture by blocking the oxygen binding site, either physically or chemically.

It will be appreciated, therefore, that further improvements in the art are needed to enable adsorption processes to satisfy the requirements of the art. In particular, further improvements are desirable with respect to transitional element complexes in order to enhance the use thereof as oxygen-selective sorbents, especially solid TEC's in supported form.

It is an object of the invention, therefore, to provide improved oxygen-selective sorbents.

It is another object of the invention to provide improved TEC oxygen-selective sorbents.

It is a further object of the invention to provide improved solid TEC sorbents deployed on supports.

With these and other objects in mind, the invention is hereinafter described in detail, the novel features thereof being pointed out in the appended claims.

SUMMARY OF THE INVENTION

TEC's are deployed in the solid phase, and are immobilized and spaced so as to avoid undesired deactivating reactions that occur with TEC's in the liquid phase. The TEC's are supported and provide for ready access of feed gas mixtures thereto at the high TEC concentrations needed for practical oxygen adsorption capabilities.

BRIEF DESCRIPTION OF THE DRAWINGS

The invention is hereinafter described in detail with reference to the accompanying drawings in which.

DETAILED DESCRIPTION OF THE INVENTION

Figure 1:
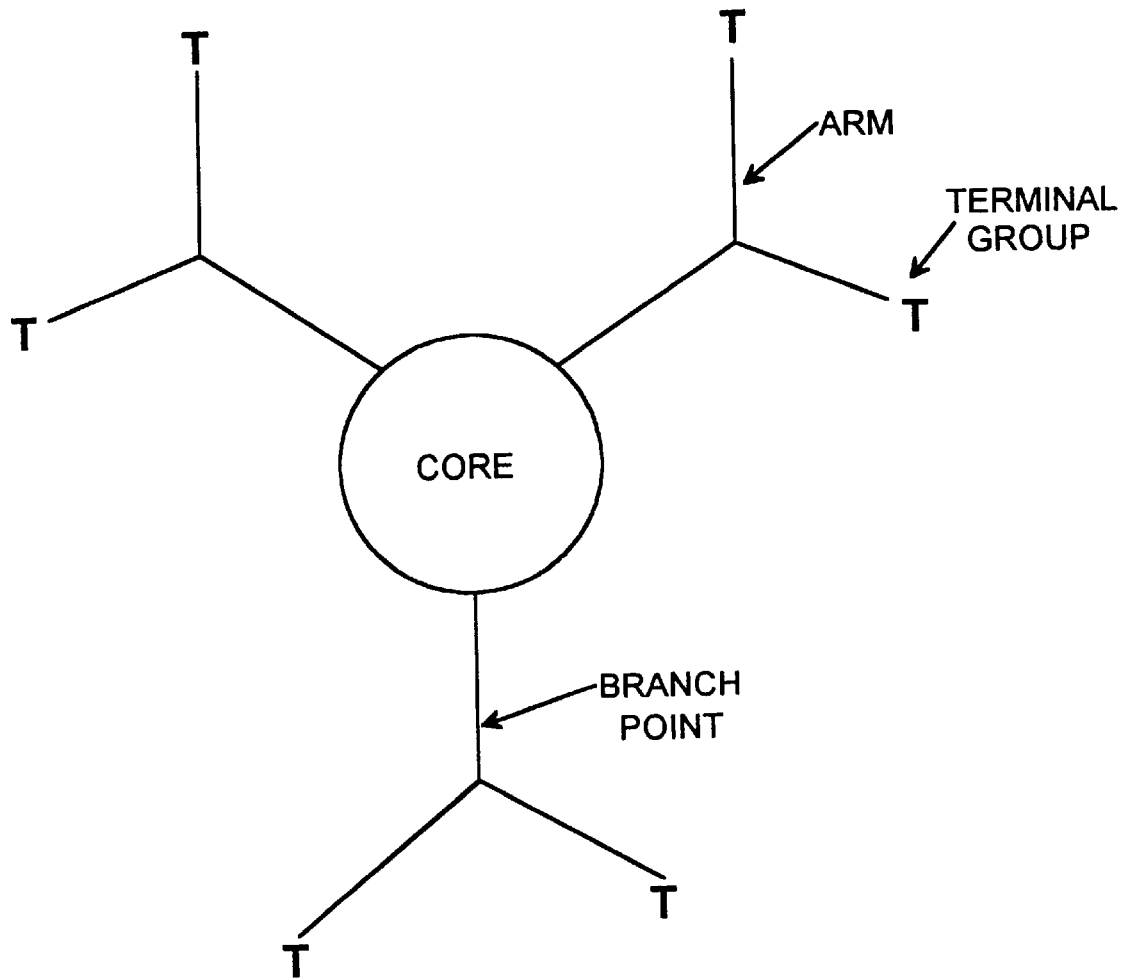
FIG. 1 is a schematic representation of a general amplifying linking agent, illustrating a trifunctional core, with each of the three branching into two units.

The objects of the invention are accomplished by the deployment of solid TEC's on supports in order to (a) fix large numbers of TEC's in space to provide high loadings and storage of selectively adsorbed oxygen, (b) obtain faster rates of adsorption and release of oxygen by maintaining accessibility and utilization of the individual TEC's, and (c) increase the useful lifetime of the sorbents by reducing the probabilities of deactivating reactions or unfavorable physical processes. The practice of the invention has two principal advantages over early methods for deploying TEC's. First, the invention yields TEC distributions that are more uniformly spaced, at distances that correspond to high oxygen adsorption capacities, but with low probabilities for bimolecular interactions. Second, the invention provides ready access of the feed gas mixture to the TEC's, even at the high TEC concentrations needed for practical oxygen capacities. These advantages derive from the chemical structure of the linking agents employed. The chemical interactions with the surfaces of these linking agents is simpler, so that it is easier to attach them to the pore walls inside an oxide or to the chains of a microporous polymer. In addition, the linking agents provide local control of TEC concentration and spacing. As a result, the TEC's are deployed so as to achieve superior performance as oxygen-selective sorbents, i.e., ones that react reversibly with oxygen, but not with nitrogen, argon or carbon dioxide.

High surface area supports for the TEC's may be achieved with either microporous particles with concave porosity, or very small particles with convex surfaces. The TEC's are distributed in either of two modes. First, the TEC's can be distributed essentially as monolayers attached to either concave or convex surfaces by novel linking agents. Second, the TEC's can be deployed as thin multilayers on convex surfaces either as amorphous or crystalline solids or as polymer attached TEC's, i.e. PATEC's. Two key novel features of the invention are (1) the application of polyfunctional molecules, including oligomers, as agents to link TEC's to support surfaces in monolayer coatings, and (2) the use of very small particles, i.e. less than 100 Å, as sorbent supports for either monolayers or thin multilayers of TEC's.

Practical sorbent materials are determined by the performance criteria that relate to, but are independent of, the PSA processing cycles that might be employed with the sorbents. Of primary interest is the equilibrium capacity for oxygen. Acceptable values typically fall in the loading range of 0.3 to 0.6 mmol $O_2$ per g sorbent, the storage range of 0.3 to 0.8 mmol $O_2$ per $cm^3$ sorbent particle, or the storage range of 0.2 to 0.5 mmol $O_2$ per $cm^3$ of a bed of particles. Higher values are desirable, but these values are acceptable, especially if the sorption rates are fast. Ranges of values are indicated because of differences in the shapes of equilibrium isotherms and differences in material densities. For these capacities to be useful, oxygen sorption rates of at least 0.3 mmol $O_2$ per g sorbent per minute are desired. To obtain these rates, the pressure driving forces can be on the order of 1 atm. The selectivity of the sorbents for oxygen can be expressed in various ways, depending on the application involved. For air separation, an air separation factor can be calculated for synthetic air from pure-gas data, either at equilibrium or at some cycle time, in the case of rate-selective sorbents. Desirable separation factor values for loading fall in the range of 10 to 20, while, for bed storage, in the range of 3 to 5.

The equilibrium-type supported TEC's of the invention are more desirable than rate-selective sorbents for two reasons. First, the selectivities can be much higher and are not time-dependent. This allows greater flexibility in process design, since the sorbent is not required to operate at short cycle times. The equilibrium selectivity arises from the fact that the TEC reacts reversibly with oxygen, but not with nitrogen or argon, so that there is a strong thermodynamic driving force that underlies the selectivity. Rate selectivity, on the other hand, depends on differences in the rates of sorption, and the kinetic driving forces can even be in the opposite direction of the thermodynamic driving forces. As soon as the less selectively adsorbed component catches up with the more selectively adsorbed component, the rate selectivity is lost.

Second, higher limiting oxygen capacities are possible below about 1,000 torr oxygen partial pressures in the practice of the invention. The shapes of the loading vs. pressure isotherms for the TEC's of the invention can be quite sharp at low pressures, in contrast to the equilibrium isotherms of known rate-selective materials. The higher limiting oxygen capacities are the result of stronger interactions between the sorbent and oxygen in the case of equilibrium selectivity. This is reflected in much more negative enthalpies of oxygen sorption for the mild chemical reactions of the TEC's than those observed for physical adsorption on rate-selective materials. Such TEC-based sorbents are much better suited for the removal of very low concentrations of oxygen in the purification of nitrogen or argon than are the rate-selective sorbents of the art.

The oxygen-selective sorbents of the invention are also more desirable than oxide-type, equilibrium-selective sorbents because the sorbents of the invention are not required to operate at high temperatures, such as above 300° C. In addition, the oxygen-selective sorbents of the invention possess less negative heats of reaction. The advantage of operating at ambient temperatures leads to lower capital costs, because special materials of construction and heat exchange equipment for higher temperature operations are not required. The large difference in operating temperatures arises from the differing mechanisms of oxygen reactions. Oxide-type equilibrium-selective sorbents require that the O=O double bond be broken in order to react to add O-atoms and/or $O^-$ ions, and this condition necessarily requires high temperatures for appreciable sorption rates. With the use of TEC sorbents, oxygen can react as a molecule, without breaking a double bond as with oxide-type sorbents. This is a much milder reaction, which is evidenced by a more positive heat of reaction, i.e. $-10$ to $-20$, compared to $-18$ to $-55$ kcal/mol oxygen.

The use of TEC's in the solid phase, as in the invention, is advantageous over the use of TEC's in the liquid phase. First, deactivating reactions, such as bimolecular oxidations, that occur readily in solutions owing to the mobility of the TEC's is avoided. In the practice of the invention, the TEC's are immobilized and spaced so as to avoid such bimolecular reactions. Second, by not using a solvent as in liquid phase TEC's, conflicting compromises that must be made in selecting a solvent are avoided. When using liquid phase TEC sorbents, the solvent employed must balance high solubility, low vapor pressure, low viscosity, and must be safe to use at relatively high oxygen concentrations.

Compared to unsupported solid TEC's, the supported solid TEC's of the invention are advantageous in that the supported TEC's can be dispersed in very thin layers, resulting in better utilization of the TEC's and faster sorption rates. For the TEC's of the invention, the intrinsic reaction rates at the TEC site are very fast, based on the results of laser flash photolysis spectroscopy and of reactions in solution. For such TEC's in the solid phase, the sorption rates are controlled by the diffusion to the reaction site, whether it is the phase boundary, as in TEC crystals, or a dispersed site, as in polymer-attached TEC's, i.e. PATEC's. The sorption rates in crystalline TEC's are proportional to the ratio

[D/(d)$^2$], where "D" is the diffusion coefficient and "d" is the smallest dimension of the crystal. For example, at constant D, the sorption rate per unit area of phase boundary in a 500 Å crystal layer will be 1600 times that in a 2 micrometer crystal. Depending on the value of D, and the time allowed for reaction, some of the TEC's inside a 2 micrometer crystal may never be utilized at all. The fraction reacted at time "t" for a planar reaction boundary is proportional to [D*t/(d$^2$)]$^{1/2}$. For equal values of "t" and "D", the volume fraction reacted in the 500 Å layer is 40 times that in the 2 micrometer crystal.

The term "supported TEC's" will be understood to include dispersed configurations, such as monolayers on adsorbent supports or multilayers within polymeric supports, as well as solid (amorphous or crystalline) layers. For the dispersed configurations, the TEC's are attached to the support through chemical bonds. Examples are (1) coupling agents on $SiO_2$ gel, and (2) the organic nitrogen bases of the copolymers of octyl methacrylate and either vinyl pyridine or vinyl imidazole. In contrast to earlier attempts to couple TEC's to adsorbent supports, the preparation methods of the invention provide novel, superior chemical linkages to adsorbent supports that lead to high coverages and, therefore, practical oxygen capacities.

The use of polymer-attached TEC's, i.e. PATEC's, can be an effective way to disperse the TEC's, especially when using TEC's whose crystals are densely packed and have very low diffusion coefficients. However, prior attempts to employ PATEC's have all utilized copolymers prepared by radical chain polymerization, which leads to problems analogous to those encountered with TEC's in liquid form. For example, the incorporation of the axial bases, which are needed for TEC's, into the polymer chain leads to a distribution of these groups that is more nearly random than equally spaced. Clusters of two or three closely-spaced TEC's will be relatively common. As a result, bimolecular oxidations and blocking reactions that occur in liquids can also occur in prior art PATEC's.

As indicated above, TEC's can be distributed essentially as monolayers attached to either concave or convex surfaces by novel linking agents, or as thin multilayers on convex surfaces either as amorphous or crystalline solids, or as PATEC's. The monolayer coatings of TEC's are linked to the support surfaces by polyfunctional linking agents. Very small particles are used as sorbent supports for either monolayers or thin multilayers. For the attaching of TEC's to a support surface through the use of polyfunctional linking agents, the most effective means is through the use of an axial base linking agent. For this mode of TEC attachment, the best configuration of TEC's in a supported monolayer is: (1) a dense side-by-side array of TEC's, (2) situated with the axis defined by the oxygen-metal-axial base bonds normal to the surface of the support layer, so that (3) the oxygen binding sites face away from the support surface. This is accomplished by providing each TEC with a linking agent molecule having an axial base group at one end and one or more groups at the other for bonding to the support surface. Examples of such linking agents are derivatives of silane "coupling agents", alkoxysilane derivatives with a single substituent containing the axial base group. It has been found that the three ideal conditions listed above are difficult to achieve with these reagents, because these molecules tend to react with each other as much as with the support surface. This problem is even more difficult inside the pores of microporous support particles.

It has been found that certain amplifying linking agents provide sorption performance superior to that obtained with only one axial base functionality. In this regard, amplifying linking agents are defined herein as chemical species wherein the number of TEC's associated with each linking agent is greater than the number of surface interaction sites. Typically, the amplifying linking agent provides two or more Lewis base sites, such as pyridine or imidazole derivatives, capable of binding TEC's to promote reversible oxygenation. In addition, there must be one or more sites capable of interacting with the surface of a support to attach and orient the linking agent and TEC's with respect to the local support surface. Examples of such amplifying linking agents are derivatives of starburst dendrimers and derivatives of arborols.

Linking agents are required for the preparation of properly spaced and oriented TEC monolayers. Up until the present time, coupling agents have been attached by covalent bonds to support surfaces, usually by condensation reactions that release product alcohols. One monofunctional linking agent must be reacted with the support for every TEC attached. The amplifying linking agents of the invention rely on milder interactions that do not release product molecules. These interactions include acid-base interactions between a Lewis base site on the linking agent and an acidic surface site, such as an OH group. For a polyfunctional linking agent such as the $DIm_6$ dendrimer, 3–6 TEC's can be attached for each dendrimer attached to the surface. The advantages of the polyfunctional linking agents used in the practice of the invention are: (1) greater ease of attachment to support surfaces, (2) more efficient TEC attachment to linking agents, (3) better control of TEC spacing to the surface, and (4) more efficient control of supported TEC reactivity.

Very small particle sizes are required for TEC monolayers on non-porous supports. For example, to obtain an oxygen loading of 0.3 mmol/g with a TEC monolayer, the surface area of the support must be 300 m$^2$/g for a TEC molecular "footprint" of 167 (Å)$^2$. To obtain a surface area of 300 m$^2$/g with dense, spherical particles, the required diameters are: 200 Å for 1.0 g/cm$^3$, 100 Å for 2.0 g/cm$^3$, and 50 Å for 4 g/cm$^3$. As a result, the particle diameters must be equal to, or less than 100 Å for common, dense support materials, such as alumina, carbon and silica. Linking agents for attaching TEC's of various types can be used, but the polyfunctional agents described above are preferred for the reasons indicated.

Very small supports are desirable for TEC multilayer coatings, such as PATEC's or neat solid TEC's. The advantage of small particles is that thinner multilayers can be used to obtain the same loadings of TEC's on the support. For constant densities of TEC and support, the TEC loading varies only with the ratio of the diameters of coated and uncoated particles. Consequently, at a fixed TEC loading, the coating thickness varies as the particle size, so that the smaller the particle, the thinner the coating. As noted above, thin layers are advantageous in achieving higher utilization of the reactants for a given adsorption time cycle. Multilayer coatings may be applied by various methods, such as deposition of solid TEC's or PATEC's from solutions in which the small support particles are dispersed.

The invention is further described with respect to various elements of the overall oxygen-selective sorbents of particular commercial interest.

A. Deployment of $O_2$-Selective Sites (Function)

Each TEC is a potential site for the reversible binding of $O_2$ if: (1) it is reactive, (2) it is accessible within the cycle time allowed, and (3) it is one of those that can react under the thermodynamic constraints for the applied conditions. The limiting number of $O_2$ molecules per unit weight that can be bound by a given unsupported TEC is given by the expression:

$$L_{lim} \text{ (mmol } O_2/\text{g TEC)} = 1000 / (MW_{TEC}),$$

where $MW_{TEC}$ is the molecular weight in grams of the TEC (including the axial base). For a supported TEC, the limiting number is given by:

$$L_{max} \text{ (mmol } O_2/\text{g sorbent)} = (1000 * W_{TEC}/MW_{TEC})/(W_{TEC}+W_{sup})$$

where $W_{TEC}$ and $W_{sup}$ are the weights of the TEC and support, respectively. The actual amount of $O_2$ bound at equilibrium, $L_{eq}(O_2)$, by a supported TEC at a given temperature and $O_2$ pressure can be approximated by the Langmuir Isotherm to be:

$$L_{eq}(O_2)(\text{mmol}/g) = f_r * L_{max} * Lang_{frac},$$

where $$Lang_{frac} = \frac{K_{eq} * p(O_2)}{1 + K_{eq} * p(O_2)},$$

and $p(O_2)$ is the $O_2$ partial pressure and $K_{eq}$ (in units of inverse pressure) is the affinity coefficient for given sorbent and temperature. Here, the fraction of TEC's that are reactive, $f_r$, is taken into account. $K_{eq}$ is the equilibrium coefficient for the reversible oxygenation reaction:

$$TEC+O_2 \rightleftharpoons [TEC \cdot O_2].$$

If a sorbent, initially at equilibrium, is displaced from equilibrium by a pressure step, $$\Delta p(O_2) = p_{final}(O_2) - p_{initial}(O_2),$$

the time dependence of the loading, $L_{time}(O_2)$, in units of mmol $O_2$ per unit weight sorbent per unit time, can be expressed as:

$$L_{time}(O_2) = [f_a * L_{eq}(O_2)] * [\text{rate}_{frac}(T, \Delta p, L, \ldots)].$$

Here $f_a$ is the fraction of reactive TEC's that are accessible, and $\text{rate}_{frac}$ is the fractional rate of unhindered approach to the new $L_{eq}(O_2)$ that corresponds to $p_{final}$. The fractional rate depends not only on the applied conditions as shown, but also on the coefficients $k_{on}$ and $k_{off}$ for the intrinsic $O_2$ reactions. For convenience, the diffusional effects have been assigned to $f_a$, which will depend on the materials properties of the supported TEC, such as thickness and porosity.

Although such analysis pertains to sorption per unit weight, it can be converted to sorption per unit volume in two stages. The storage (loading per unit volume) for an individual piece of the supported sorbent can be obtained from the appropriate loading values by multiplying by the piece density, $\rho_{piece}$, in units of g/cm³, for example. The storage for a bed of such individual pieces must account not only for the storage on the pieces, but also for the storage in the interparticle voids. Thus, the bulk density, $\rho_{bulk}$, and the gas densities must also be known.

The subject invention is directed particularly to maximize $L_{time}(O_2)$, even at the expense of lower TEC loadings or storage. From the preceding equations, following the expression is obtained:

$$L_{time}(O_2) = \frac{f_r * f_a * L_{lim} * W_{TEC} * Lang_{frac} * rate_{frac}}{W_{TEC} + W_{sup}}.$$

To a first approximation, the terms $f_r$, $f_a$, $W_{TEC}$, and $W_{sup}$ depend on deployment, while the others depend primarily on the identity of the TEC. The invention deliberately uses finite or increased values of $W_{sup}$ in order to obtain greater increase in the value of the utilization (the product $[f_r * F_a]$) so that a net increase in $L_{time}(O_2)$ is obtained. To maximize $f_r$, we deploy the TEC's on solid supports in order to avoid the deactivating reactions in solutions. To maximize $f_a$, the TEC's are attached either in monolayers or in thin multilayers. To maximize $W_{TEC}$ for a given value of $W_{sup}$, high number density forms of these coatings are employed.

The particulars of the invention relate to this strategy as follows. Novel classes of amplifying linking agents for producing TEC monolayers on support surfaces are disclosed and claimed herein. To achieve practical $O_2$ loadings and storage, particle diameters $\leq 100$ Å are used for dense TEC supports, whether for monolayers or thin multilayers.

B. Linking Agents

1. Function

The function of the linking agent is to attach the TEC's to the support in a monolayer in such a way as to maximize the number of reactive TEC's. The linking agent can be a separate species, part of the TEC, or part of the support particle, as in the case of an organic polymer supports. The linking agent can be attached to the support by means of various interactions, including covalent bonds and acid-base interactions. TEC's may be attached to the linking agents in several ways. A particularly efficient way to attach TEC's to a substrate is through the axial base. Attachment through other groups on the TEC is also possible, e.g., to the tetradentate ligand. However, another molecule must either be the axial base or provide it, and the $O_2$ binding site must be accessible. Previously, others have used monofunctional linking agents, i.e., those with one TEC attached per linking agent. In the practice of the invention, amplifying linking agents are those with more than one TEC attached per linking agent.

The role of the linking agent is evident in the relationship between the support particle surface area and the maximum $O_2$ loading of the attached TEC's. For a monofunctional linking agent with a cross-sectional area less than that of the TEC, the "footprint" area, $A_{TEC}$, of the attached TEC will determine the minimum spacing and the maximum number of TEC's in a monolayer on a given surface. The minimum surface area of a support, $A_S$, required for a TEC monolayer to provide a given $L_{max}$ is:

$$A_S(m^2/g) = [L_{max} * N_{AVO} * A_{TEC}(\text{Å/molecule})] * 10^{-23},$$

where $N_{AVO}$ is Avogadro's Number. For a TEC with a footprint of 167 Å², a minimum surface area of 300 m²/g is required to provide a value of $L_{max}$=0.3 mmol/g. The values of $A_{TEC}$ change with the structure and composition of the TEC. These values can be estimated from models of the known structure. For example, the value for 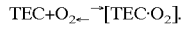Co($T_{piv}$PP)/Im is about 225 Å/molecule, for attachment through the axial base.

The actual surface area values will be greater, and the molecular weights and dimensions of both TEC and linking agent must be considered. The larger and heavier the linking agent per TEC, the higher the surface area required for a given $L_{max}$. For very small particles, the mass and volume of the coated particle are significantly different from the uncoated, so that the molecular properties of the TEC and linking agent affect both $A_S$ and $L_{max}$. From a geometrical point of view, small, rod-shaped, monofunctional linking agents would be superior to relatively large, bulkier amplifying ones. From a preparative point of view, however, the linking agents of the invention are much simpler to attach, and they provide local control of spacing that the monofunctional ones do not.

2. Types

Two categories of linking agents are identified as components of TEC based sorbents. These are linear (non-amplifying) linking agents, and amplifying linking agents. The term non-amplifying ("linear") linking agents indicates linking agents where the number of sites available to TEC's is less than or equal to the number of interaction sites or regions with the support. The nature of the interaction sites in the linking agent for the TEC and the support can be similar or different, and the interactions can be either covalent or non-covalent.

Non-amplifying linking agents are particularly suited to supports where the number of interaction sites per unit area is high. A convenient configuration occurs when the linking agent provides a Lewis base group to serve as an axial donor to a transition metal center to give an oxygen-selective TEC. The modification of surfaces by commercial silane coupling agents, $X_3SiRY$, has been described in the art where X is a group for attachment to "mineral surfaces", Y is an organic functional group, and R is a hydrocarbon group. This example represents non-amplifying covalent attachment at multiple sites, and examples of coupling agents include $(EtO)_3SiCH_2CH_2CH_2NH_2$ and $(MeO)_3CH_2CH_2CH_2NHCH_2CH_2NH_2$. Similar approaches have been used for the immobilization of "homogeneous" organometallic complex catalysts.

Alternative examples of linear linking agents which provide Lewis base groups to give oxygen-selective TEC sites include substituted heterocycles where the functionality is selected for interaction with surface groups on a porous support or on small particles either covalently (using known synthetic organic transformations) or non-covalently. Examples of the former category include the condensation of substituted pyridine carboxylic acid esters with a porous solid support containing primary or secondary amine functionalities. An example of the latter class is provided by the interaction of an aminoalkylpyridine or an aminoalkylimidazole with an acidic support. This particular example relies on a difference in $pK_a$ between the functional groups present. The linking agent can also be selected where the functional groups used for interaction with the surface and the transition metal center are the same. Examples of this class include diazabicyclo[2.2.2]octane and hexamethylenetetramine. The Lewis base groups serve as axial ligands giving rise to oxygen-selective TEC'S. These cage structures orient the Lewis base with respect to the surface due to steric considerations.

Surface amplifying linking agents are defined as linking agents where the number of TEC's associated with each linking agent is greater than the number of surface interaction sites. Polydisperse systems containing multiple Lewis base sites can serve as surface amplifiers with an acidic substrate and examples include poly(ethyleneimine) and poly(ethyleneglycol). In these examples, the Lewis base is involved in surface attachment and axial donation to provide oxygen-selective sites. However, transport into porous supports is expected to be slow, and it will be difficult to control the amount of donors available to transition metal centers and the orientation with respect to the surface. Therefore, alternative configurations are preferred. Monodisperse surface amplifying linking agents have been prepared and a general form is shown schematically in FIG. 1. These linking agents contain one or more branching points and steric effects serve to orient the Lewis base groups away from the surface. Lewis base groups suitable for coordination to a transition metal chelate to give an oxygen-selective sorbent include oxygen, nitrogen, or sulfur heterocycles, and ethers, amines, or thioethers. Examples include substituted pyridines and substituted imidazoles.

The invention comprises the use of new surface amplifying linking agents for ANY oxygen-selective sorbent and with ANY TEC and/or substrate. Also claimed are compositions based on non-amplifying (linear) linking agents where the linking agent provides a Lewis base donor for axial coordination to a transition metal chelate to give an oxygen-selective TEC, but excluding the use of silane coupling agents with mineral surfaces.

Figure 2:
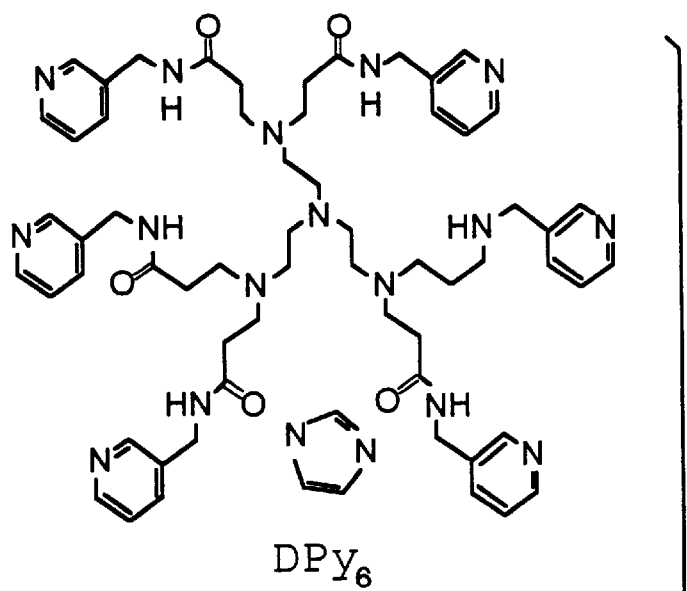
FIG. 2 is a schematic representation of the molecular structure of $DPy_6$ and $DIm_6$ linking agents.
Figure 2:
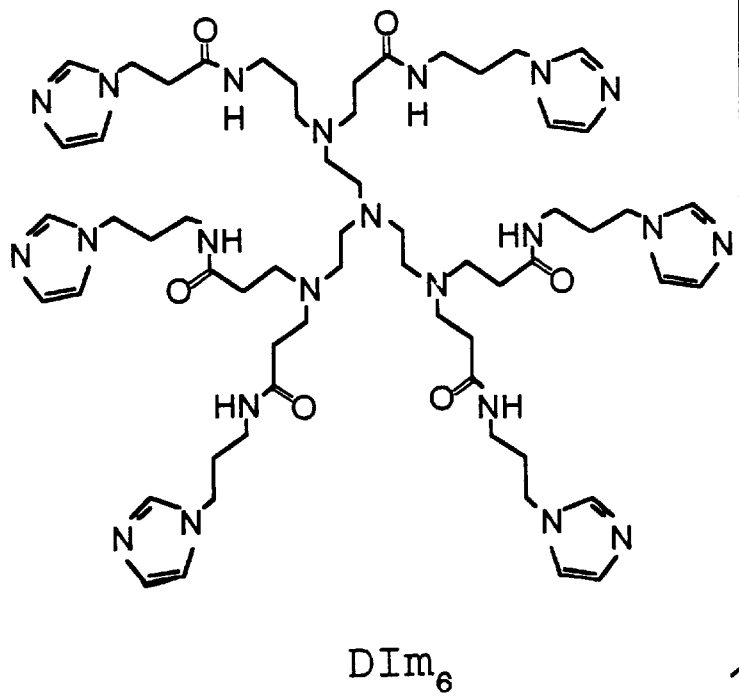

Examples of amplifying linking agents bearing Lewis base groups are provided by modified dendrimers, particularly the low generation examples. The general structures and syntheses of dendrimers has been reviewed recently in the art. Modifications to dendrimer structures to provide terminal Lewis base groups suitable for interaction with TEC's are accomplished using synthetic transformations used in dendrimer growth but with alternative reagents. The amplifying linking agents $DIm_6$ and $DPy_6$, as shown in FIG. 2, have been prepared using general methods described in the art for synthesis of PAMAM (polyamidoamine). See Tomalia et al *Agew. Chem. Int. Ed. Engl.*, 29, (1990) dendrimers but using tris(aminoethyl)amine as a core, methyl acrylate for branching, and an aminoalkyl-substituted heterocycle to provide terminal groups. Related structures are possible where the core and the composition of the terminal unit (heterocycle, linking arm) are varied.

In general terms, the structure and composition of the amplifying linking agent is highly versatile. Variations can conveniently be made to one or more of the following features: the core (including functionality present and multiplicity); the multiplicity of branching points; the nature of linking arms; the functionality present and reaction types; and the structure and substitution patterns of terminal groups.

The TEC units can be either incorporated as part of the amplifying linking agent (covalently attached to the ligand periphery) or the linking agent can provide Lewis base donors which interact with transition metal chelates in an axial manner to give oxygen-selective TEC'S. In the latter category, the Lewis base groups are typically nitrogen, sulfur, or oxygen heterocycles, amines, ethers or thioethers.

Figure 3:
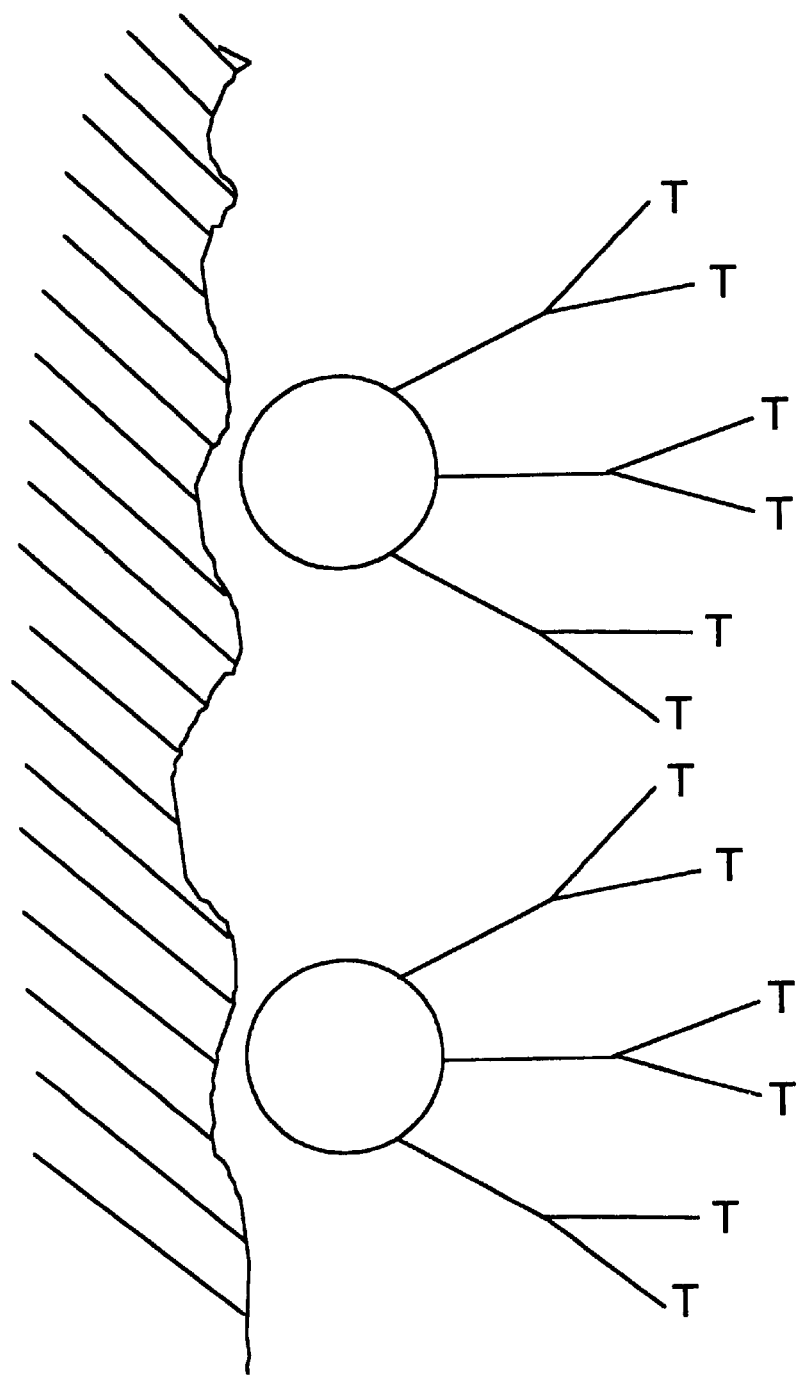
FIG. 3 is a schematic representation of the orientation of an amplifying linking agent with respect to the surface of a supporting substrate.

The linking agent also serves to interact with the substrate surface in a manner such that the terminal groups project away from the surface, as shown in FIG. 3. This can be accomplished using either covalent or non-covalent interactions between the support surface and functionality associated with either the core, branching groups, or linking arms. These points are illustrated for $DIm_6$ with a silica gel support and a transition metal chelate. The $DIm_6$ molecule has a central core which contains strongly basic tertiary amine groups which combine with an acidic surface, leaving the N-substituted imidazole termini to project away from the surface and combine with the transition metal centers to form the oxygen-selective TEC'S. The presence of a monolayer coating of $DIm_6$ onto the interior surfaces of $SiO_2$ supported by uptake studies of $DIm_6$, from solution onto silica gel. The availability of imidazole groups for coordination to transition metal sites is indicated indirectly by sorption studies after the TEC coating is formed.

Advantages of amplifying linking agents over linear (non-amplifying) linking agents is that they can be utilized with support surfaces which possess only a small population of interaction sites per unit area. Steric effects favor the projection of terminal groups away from the surface so that TEC orientation is accomplished.

Figure 4:
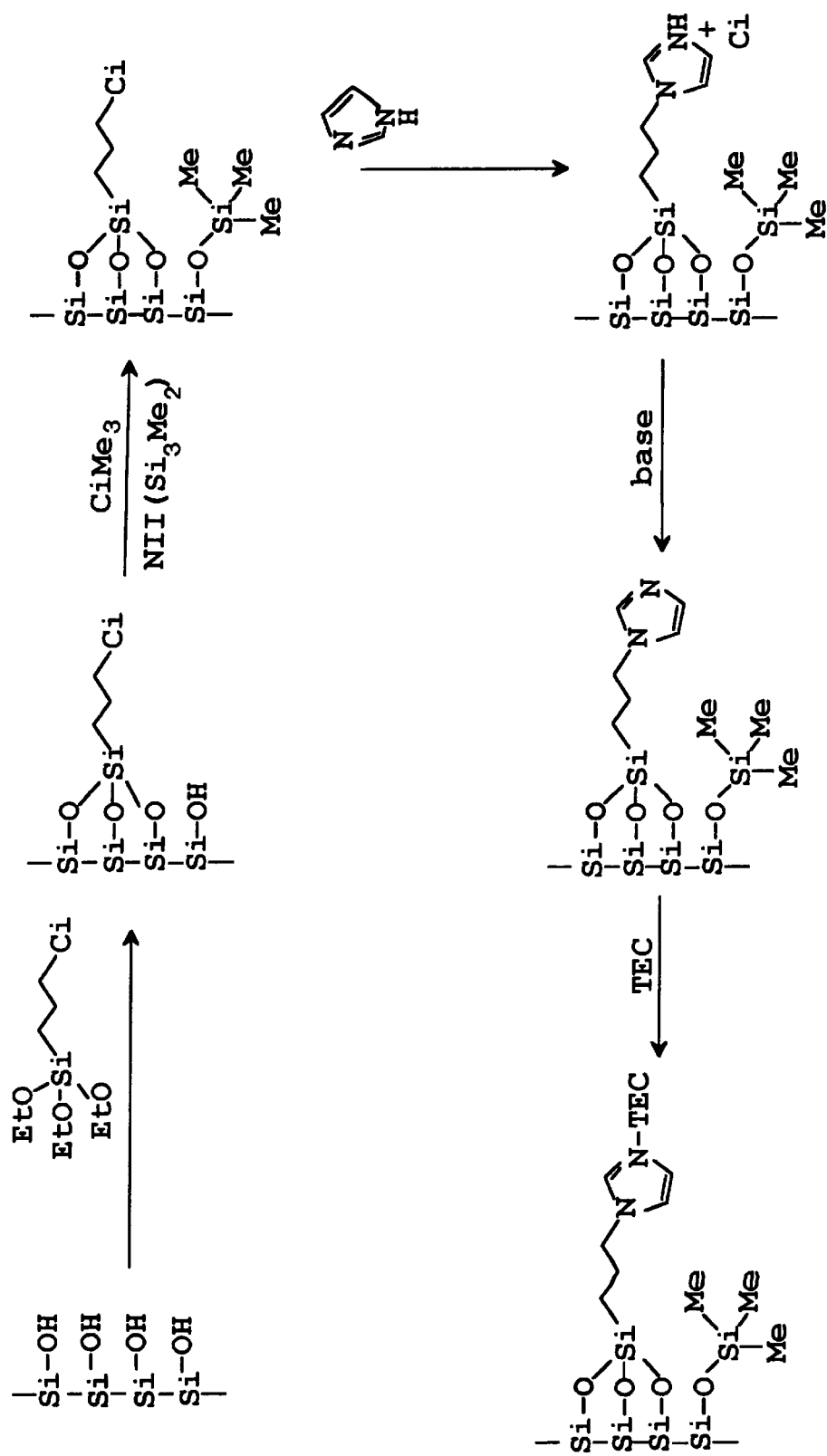
FIG. 4 is a representation of the synthesis of a TEC modified silica surface.

A synthetic method using coupling agents for covalent attachment of non-amplifying linking agents is shown in FIG. 4 based on methods described by Basolo, et al J. Amer. Chem. Soc. 97, 5125 (1975). The oxygen sorption capacities of materials prepared in this manner are inferior relative to related materials using $DIm_6$. In addition, the use of acid-base interactions is simple and involves no byproducts. However, it should be noted that covalent attachment of amplifying linking agents could be utilized where the amplifier is either grown from the surface or a preformed amplifier is attached to a surface.

C. Transition Element Complexes

The function of the TEC is to provide a site for the reversible, selective binding of oxygen. The selectivity of the TEC for oxygen over other gases such as $N_2$ and Ar gives rise to the $O_2$-selectivity of the TEC-based sorbents of this invention. The desired performance of a given sorbent will rely on matching the structure and composition of the TEC and its associated axial base with the $O_2$ concentrations of the gas mixtures to be separated.

Figure 5A:
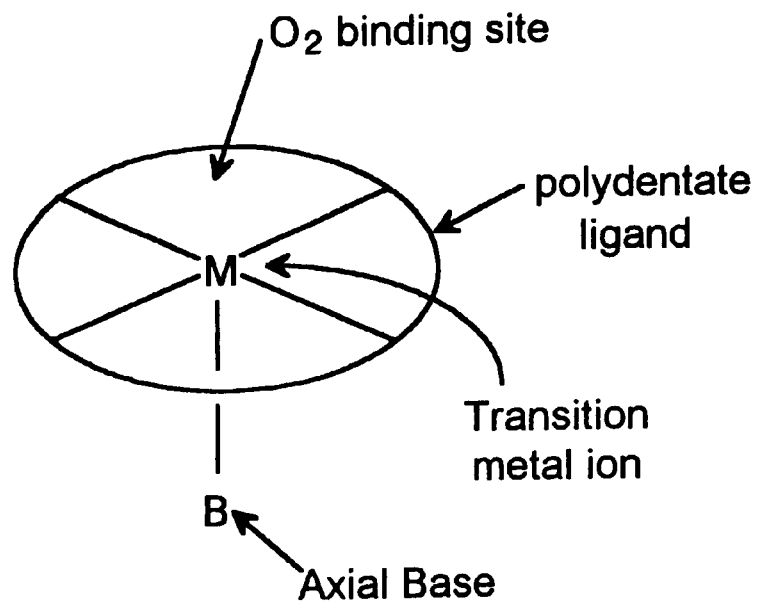
FIG. 5 is a schematic representation of TEC structures, with FIG. 5(*a*) being a tetradentate ligand with exogenous axial base, and FIG. 5(*b*) being a pentadentate Ligand.
Figure 5B:
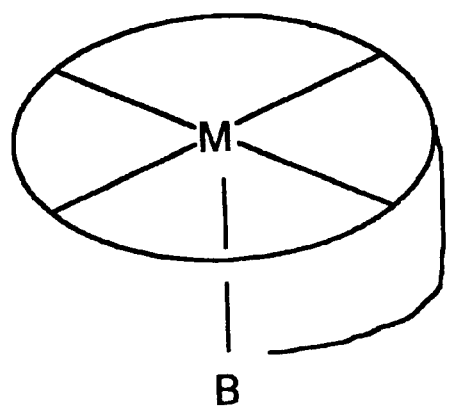

The definition of transition element complexes (TEC's) is limited to those transition element complexes which have reversible and selective interactions with molecular oxygen. FIG. 5 shows schematic representations of TEC structures and their components. Three components are essential for a TEC to function as an $O_2$-selective compound: (1) a transition metal ion located centrally in the complex, (2) a polydentate ligand which chelates the transition metal ion, and (3) an axial base which is bound to the transition metal ion. The axial base may be exogenous, as shown in FIG. 5(a), or endogenous, i.e., part of the ligand structure, as shown in FIG. 5(b). Cyanometallate salts such as lithium pentacyanocobaltate solvates are not included since the ligands do not chelate (simultaneously bind using different sites to the same metal ion). Polymeric chelating ligands are included.

With regard to the TEC's of this invention, we claim appropriate combinations of the following components: 1) metal ions: Co(II), Fe(II), Ni(II), Mn(II), Ru(II), Ru(III), Cu(I), and Rh(III), 2) ligands: porphyrins, Schiff bases, polyamines, polyoxoamides, oximes and their derivatives, and cyclidenes, and 3) axial bases: pyridine, imidazole, and their derivatives. Preferred embodiments include appropriate combinations of the following: 1) cobalt(II) as the metal ion, 2) picket-fence porphyrin and related porphyrin dianions as ligands, low molecular weight ligands such as malen and related Schiff bases, and tetraazaannulene ligands, and 3) axial bases of N-substituted imidazoles and 3- and/or 4-substituted pyridines as axial bases.

D. Substrates

The function of the substrate is to provide a solid support on which to deploy TEC's (with or without linking agent), to distribute said TEC's, and to serve as heat sinks for the adsorption processes. The substrate should be inert with respect to TEC's in both oxygenated and non-oxygenated forms. Where necessary, a linking agent can be used to ensure that these criteria are met. The substrate should be available in a suitable form for coating with monolayers or thin multilayers of TEC's (and linking agents if necessary) to provide practical oxygen storage capacities. In addition, the substrate surface should be suitable for coating with linking agent and/or TEC units.

Two alternative substrate configurations for coating are considered. These are small particles or clusters of particles (convex surface) and porous materials (concave surface). In each case, the surface area available for coating is of particular interest. In order to have a surface area greater than 300 $m^2/g$, for a pore volume of 0.9 $cm^3/g^{it}$ is necessary to have a pore diameter less than 130 Å. For a pore volume of 0.5 $cm^3/g$, a pore diameter less than 70 Å is required.

It should be noted that additional features should accompany the surface area requirement ($\geq 300$ $m^2/g$). For example, the dimensions of linking agents and TEC's restricts the internal coating of porous substrates to thin layers. In addition, it is necessary to provide sufficient accessible pore volume for the transport of linking agent and TEC to interior regions of the substrate.

Calculations based on a TEC footprint of 167 $(Å)^2$ have indicated that surface areas $\geq 300$ $m^2/g$ are required for practical materials. To achieve a surface area $\geq 300$ $m^2/g$ for dense spherical small particle substrates it is necessary to have a particle diameter below 200 Å (particle density 1.0 $g/cm^3$) or 100 Å (particle density 2.0 $g/cm^3$). For common, dense supports such as $SiO_2$ and $Al_2O_3$, particle diameters below 100 Å are required. Small dense particles are suitable for coating with either monolayers or thin multilayers of TEC (linking agent or a Lewis base containing species can be a component of the TEC system). Notice that clusters of small particles are included as useful substrates.

The use of substrates for TEC coatings employing linking agents requires that the linking agent and substrate interact. Similar interactions can be obtained for any porous or non-porous small particle substrate incorporating acidic surface groups (Lewis or Bronsted). In general, the choice of linking agents will be dependent on substrate surface groups. For example, a linking agent bearing acidic groups could be employed for a substrate containing basic groups. Other interactions can also be exploited including H-bonding, electrostatic, and covalent bonding. Porous substrates or dense small particle substrates can be used where the surface contains Lewis base groups suitable for interaction with transition metal sites to provide oxygen-selective TEC coatings (i.e. no linking agent).

The composition of the substrate for both porous and dense small particle categories includes inorganic (mineral) supports such as: single oxides ($SiO_2$, $Al_2O_3$, $TiO_2$); mixed oxides ($Al_2O_3$—$SiO_2$, glasses, clays); carbons, modified carbons, and carbon foams. Also included as substrates are porous polymeric compositions such as crosslinked polymers and copolymers, macroreticular resins, phase separated polymers (e.g Nafion, Flemion), and "microporous" polymers (such as PTMSP poly[1-(trimethylsilyl)-1-propyne] (See Chen et al "GAS PERMEABILITY OF POLY[-1-(TRIMETHYLSILYL)-1PROPYNE] MEMBRANES MODIFIED BY HEXAFLUOROBUTYL METHACRYLATE" *JOURNAL OF MEMBRANE SCIENCE*, 82 (1993) 99–115)). Porous condensation polymers such as polyamides and polyimides are also included. These polymer categories can be used with or without linking agent. Porous polymers and copolymers containing potential axial donors (e.g. polyvinylpyridine type or polyvinylimidazole type) or groups which are easily modified to provide potential axial donors are included.

All substrates are claimed from the categories above which fit the minimum surface area requirement ($\geq 300$ $m^2/g$) or that provide an effective surface area $\geq 300$ $m^2/g$ when combined with a linking agent. Substrates should be inert with respect to TEC (using linking agent if necessary) and be coatable with a suitable linking agent and/or TEC.

Substrates are preferred that have a high solid density, low cost, and are available in various forms or sizes. Examples which meet this preferred criteria include $SiO_2$, $Al_2O_3$, $TiO_2$ porous glasses, clays and pillared clays, and carbon adsorbents.

Depending on the substrate, a variety of configurations may be available which could be used as adsorbents. Examples of configurations are listed below with examples of substrates shown in parentheses: microporous particles ($SiO_2$, $Al_2O_3$); dense small particles; beads (porous glass, clays); fibers (adsorbent carbons); sheets ("microporous" polymers such as PTMSP); and composites (ceramic monoliths, pillared clays).

E. Preparation of $O_2$-Selective Sorbents

1. Generic Methods

It should be noted that coating of substrates with TEC's can actually be accomplished with or without the intervention of a linking agent. Examples where the linking agent is not required includes the ion-exchange of cationic TEC's with ion exchangeable units on the substrate surface. In addition, combinations of transition metal chelates with Lewis bases which do not function as linking agents can be used to give oxygen-selective sorbents where the coating is amorphous (non-oriented) or crystalline. The use of linking agents, however, is generally preferred such that TEC orientation is accomplished relative to the substrate surface.

Figure 6A:
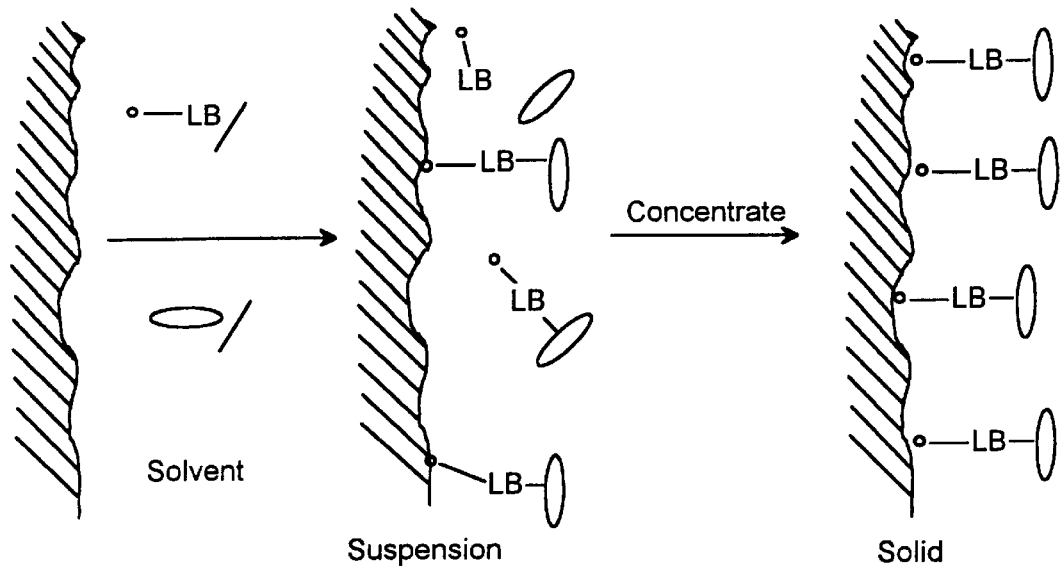
FIG. 6 is a schematic representation of the introduction of linking agent and TEC onto the surface of a substrate, with FIG. 6(*a*) representing simultaneous loading and FIG. 6(*b*) representing sequential loading.
Figure 6B:
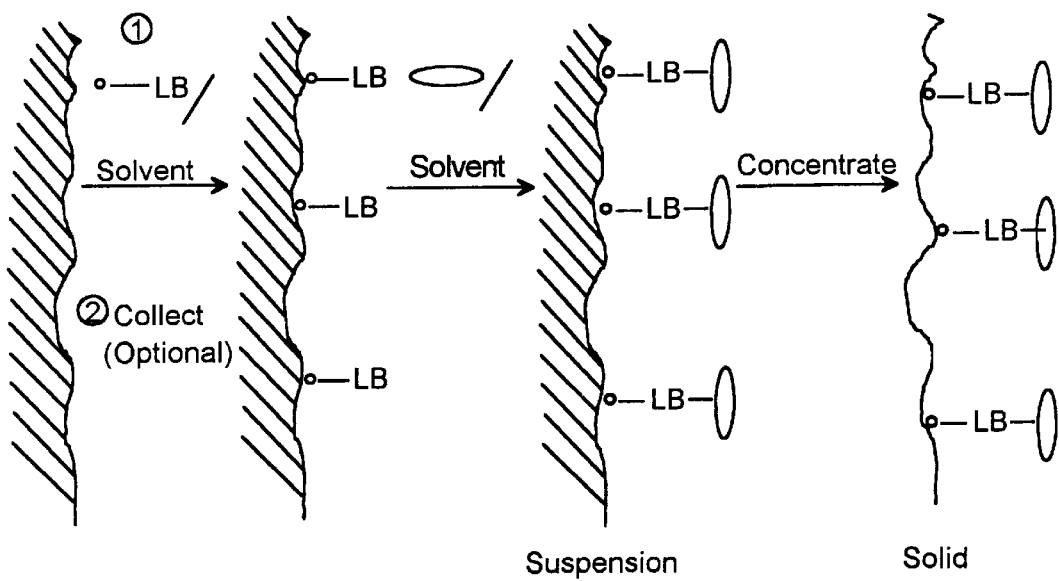

FIG. 6 illustrates two alternative methods that have been employed for the introduction of TEC's incorporating linking agents onto substrates. A simultaneous method is shown in FIG. 6(a), and sequential method, is illustrated in FIG. 6(b). These methods are useful for coating porous substrates and non-porous small particle substrates with TEC's including Lewis base/TEC combinations. Pretreatment of the substrate may be necessary. For example, silica gel substrates were dried under vacuum at 100° C. for several days prior to use. Silica small particles were dried at 100° C./0.02 torr until no change in pressure was observed for the drying system over several hours. Other substrates should be dried or activated to remove adsorbed materials using methods appropriate to the substrate and the adsorbate. The coating procedures are performed under dry, anaerobic conditions using anhydrous solvents. Solvents are selected based on TEC solubility and compatibility with TEC and other components. For sequential methods (see below), it is desirable to use solvents where the linking agent shows a substantially lower solubility than the TEC.

The simultaneous coating method involves the formation of a slurry of the substrate with a solution containing the TEC (or TEC precursor) and either a linking agent or an additional component that can serve as an axial base. Solvent removal is used to deposit a layer of the oxygen-selective TEC (and linking agent if present) onto the support surface. It is sometimes convenient to preform a solid containing linking agent and TEC by concentration of a mixed solution. This mixed solid can be combined with the substrate using a solvent in a subsequent step. This method is not distinguished from a method where the linking agent, TEC, and substrate are mixed directly in an appropriate solvent.

The sequential coating method is used to deposit a monolayer of linking agent onto the support surface in an initial step. This method is preferred when there is significant interaction strength between the linking agent and the substrate. The linking agent is coated onto the substrate by adsorption from a solution containing an excess of the linking agent, then the coated support is collected by filtration and dried. Introduction of the TEC component is performed by addition of the coated substrate to a solution containing TEC under conditions where extraction of the linking agent from the surface is minimized (typically ambient temperature for several days), then the solvent is allowed to evaporate slowly. Alternative ways to collect the particles are applicable and these include filtration and centrifugation. In both sequential and simultaneous methods, the oxygen-selective TEC-coated substrate is dried under vacuum at temperatures from 25 to 100° C. prior to use as sorbents.

We have found that materials prepared using amplifying linking agents by simultaneous and sequential loading methods do not show identical properties. For example, the equilibrium oxygen uptake (expressed in mmol/g) is higher for current materials based on simultaneous methods, whereas the oxygen uptake and release rates tend to be faster for sequentially loaded samples. This is thought to reflect differences in composition (TEC content and location). It is felt that samples prepared by simultaneous methods with a $SiO_2$ substrate contain oxygen-selective TEC units as internal or external multilayers and that these are responsible for slower uptake and release rates compared to sequentially prepared samples.

2. Examples of Specific Embodiments a) General Materials and Procedures

All reagents were obtained from Aldrich unless otherwise noted and were purified by standard methods if necessary. Solvents were purchased as anhydrous reagents in Sure/seal vessels. The preparation of meso-tetra (α, α, α, α-o-pivalamidophenyl) -porphyrinato cobalt(II) (abbreviated as $Co(T_{piv}PP)$) was based on procedures reported by Collman. All synthetic procedures excluding preparation of amplifying linking agents were performed under inert atmosphere conditions.

Silica gel used for dispersal in the examples shown was a 60 Å grade with 130–270 mesh and a BET surface area of 500 $m^2$/g and a pore volume of 0.75 $cm^3$/g. The silica gel was dried in a vacuum oven at 100° C. for 16 h then transferred to a glove box. Asahi 80 Å porous glass was cleaned using hydrogen peroxide at 90° C., rinsed with water, then dried under nitrogen purge at 80° C., followed by heating under vacuum to 140° C. Small particle $SiO_2$ xerogels were prepared by desolvation of a colloidal sol of 50 Å $SiO_2$ small particles (pH=9.0; concentration=~0.1M $SiO_2$). $SiO_2$ small particles were prepared by grinding the xerogels to a fine powder, followed by drying at 100° C./0.02 torr until no change in pressure was observed for the drying system over several hours.

$DIm_6$, was prepared in two steps by the reaction of tris(2-aminoethyl)amine in methanol with six equivalents of methyl acetate in methanol followed by six equivalents of N-(2-aminoethylimidazole) in methanol using the general procedures described by the art for the preparation of the so-called PAMAM dendrimers. The product was dried under vacuum with temperature maintained below 50° C. An infrared spectrum of the product recorded as a thin film contains signals at 1740, 1665, 1565, and 1515 $cm^{-1}$.

Impregnation of $SiO_2$ with $DIm_6$ was performed for sequential loading procedures and is illustrated here for $DIm_6/SiO_2$. Predried silica gel (0.4995 g) was treated with $DIm_6$ (0.235 g) in chloroform (10 ml) under an inert atmosphere at room temperature. The system was stirred for 24 h then the solid was collected by filtration. The $DIm_6$ content of the solid lies in the region 16–18 wt. % and extraction of the physically adsorbed $DIm_6$ with $CHCl_3$ is not favorable. A similar procedure was used for the preparation of $DPy_6/SiO_2$ to give solid containing 20 wt. % $DPy_6$.

b) Examples of Amplifying Linking Agents

EXAMPLE 1

$Co(T_{piv}PP)/DIm_6$

A solution of $DIm_6$ (0.0228 g) in methanol (5 ml) was added to $Co(T_{piv}PP)$ (0.1050 g), then methanol was added to give a solution volume of 10 ml. After stirring for 3 h, the solution was filtered to remove excess Co($T_{piv}$PP). The filtrate was allowed to concentrate by slow evaporation and was then dried under vacuum to give a brown solid, mass 0.0858 g. Assuming that the $DIm_6$ remains in the methanol and that only Co($T_{piv}$PP) is removed by filtration, the composition of the solid corresponds to 76 wt. %

EXAMPLE 2

Co($T_{piv}$PP)/$DIm_6$

Co($T_{piv}$PP) (0.1225 g) in chloroform (5 ml) was added to a solution of $DIm_6$ (0.0467 g) in chloroform (5 ml). The solution was stirred for 1 h, then the solution was concentrated to dryness under vacuum. Based on the amounts of reagents used, the solid contains 72 wt. % Co($T_{piv}$PP) (0.678 mmol/g).

EXAMPLE 3

Co ($T_{piv}$PP) /$DIm_6$/$SiO_2$, Simultaneous

Chloroform (0.5 ml) was added to a mixture of $DIm_6$/Co ($T_{piv}$PP) (47.8 mg, composition 76 wt. % Co($T_{piv}$PP)) and silica gel (5.6 mg) then the solvent was allowed to evaporate slowly overnight to give a purple solid. The sample was dried under vacuum prior to sorption studies. The sample composition corresponds to 10 wt. % $SiO_2$.

EXAMPLE 4

Co($T_{piv}$PP)/$DIm_6$/$SiO_2$, Simultaneous

Chloroform (0.5 ml) was added to a mixture of $DIm_6$/Co ($T_{piv}$PP) (20.9 mg, composition 76 wt. % Co($T_{piv}$PP)) and silica gel (8.7 mg) then the solvent was allowed to evaporate slowly overnight to give a purple solid. The sample was dried under vacuum prior to sorption studies. The sample composition corresponds to 29 wt. % $SiO_2$.

EXAMPLE 5

Co($T_{piv}$PP)/$DIm_6$/Porous Glass, Simultaneous

Chloroform (2 ml) was added to a mixture of $DIm_6$/Co ($T_{piv}$PP) (31.5 mg, composition 76 wt. % Co($T_{piv}$PP)) and Asahi 80 Å porous pieces. The sealed system was allowed to stand for 18 h, then the solvent was allowed to evaporate slowly. The solid obtained was dried under vacuum for 6 h prior to sorption studies. The sample composition corresponds to 30 wt. % porous glass.

EXAMPLE 6

Co ($T_{piv}$PP) /$DIm_6$/$SiO_2$, Sequential

Benzene (2 ml) was added to a mixture of $DIm_6$/$SiO_2$ (0.1718 g, 18 wt. % $DIm_6$) and Co($T_{piv}$PP) (0.0538 g). The system was sealed, then the contents were stirred for 24 h. The solvent was allowed to evaporate slowly to give a purple solid. The sample was dried under vacuum prior to sorption studies. The sample composition corresponds to 24 wt. % Co($T_{piv}$PP).

EXAMPLE 7

Co($T_{piv}$PP)/$DPy_6$/$SiO_2$, Sequential

Chloroform (2 ml) was added to a mixture of $DPy_6$/$SiO_2$ (0.1010 g, 20 wt. % $DPy_6$) and Co($T_{piv}$PP) (0.0538 g). The system was sealed and allowed to stand at room temperature for 17 h. The solvent was allowed to evaporate slowly overnight to give a purple solid. The sample was dried under vacuum for 6 h prior to sorption studies. The sample composition corresponds to 35 wt. % Co ($T_{piv}$PP)

EXAMPLE 8

Co (acacen) /$DIm_6$/$SiO_2$, Sequential

Chloroform (2 ml) was added to a mixture of $DIm_6$/$SiO_2$ (0.1058 g, 18 wt. % $DIm_6$) and Co(acacen) (0.0260 g). The system was sealed and allowed to stand at room temperature for 2 h then the solvent was allowed to evaporate slowly overnight to give a orange solid. This solid was dried under vacuum for 3 h. The sample composition corresponds to 20 wt. % Co(acacen).

EXAMPLE 9

Co(TPP)/$DIm_6$/$SiO_2$, Sequential

Chloroform (2 ml) was added to a mixture of $DIm_6$/$SiO_2$ (0.0319 g, 19 wt. % $DIm_6$) and Co(TPP) (1.045 g). The system was sealed and allowed to stand for 2 h then the solvent was allowed to evaporate slowly to give a purple solid. This solid was dried under vacuum for 6 h. The sample composition corresponds to 77 wt. % Co(TPP).

EXAMPLE 10

Co($T_{piv}$PP)/$DIm_6$/PTMSP Sequential

PTMSP (36.8 mg) and $DIm_6$/Co($T_{piv}$PP) (54.4 mg) were dissolved in chloroform (5 ml) then the solution was stirred for 3 days. The viscous solution was cast onto a teflon dish then the surface was covered with a glass dish to slow the solvent evaporation process. After one day the surface appeared dry. The sample was slowly placed under vacuum to remove residual solvent.

c) Examples of Small Particles

EXAMPLE 11

Co($T_{piv}$PP)/BzIm

Co($T_{piv}$PP) (0.874 g) was added to a stirred solution of 1-benzylimidazole (0.0246 g) in chloroform (4 ml) and the solution was allowed to evaporate slowly over several days, with stirring, to give a dark solid. The sample was dried under vacuum for 18.5 h prior to sorption testing. This unsupported solid (0 wt. % $SiO_2$) was used for comparison with $SiO_2$ supported samples.

EXAMPLE 12

Co($T_{piv}$PP)/BzIm/$SiO_2$

1-Benzylimidazole (0.0246 g) was added to a stirred suspension of $SiO_2$ small particles (0.0305 g) in chloroform (2 ml). The suspension was stirred for several minutes, Co($T_{piv}$PP) (0.0874 g) was added, and the solution was allowed to evaporate slowly over several days, with stirring, to give a dark solid. The sample was dried under vacuum for 22 h prior to sorption testing. The sample composition corresponds to 8 wt. % $SiO_2$.

EXAMPLE 13

Co($T_{piv}$PP)/BzIm/$SiO_2$

1-Benzylimidazole (0.0246 g) was added to a stirred suspension of $SiO_2$ small particles (0.0305 g) in chloroform (2 ml). The suspension was stirred for several minutes, Co($T_{piv}$PP) (0.0874 g) was added, the reaction vessel was capped, and the mixture was allowed to stir for 1.5 hr. The vessel was then uncapped and solvent was allowed to evaporate over several weeks to give a dark solid. The solid was ground then dried under vacuum for 10 h prior to sorption testing. The sample composition corresponds to 21 wt. % $SiO_2$.

EXAMPLE 14

Co(malen)/$Me_2Im$/$SiO_2$

Chloroform (15 ml) was added to a mixture of Co(malen) (0.3254 g), $Me_2Im$ (0.2234 g), and $SiO_2$ (0.5020 g) then the solvent was allowed to evaporate. When the sample appeared dry, additional chloroform (10 ml) was added and slow evaporation was allowed to occur. The solid was dried under vacuum prior to sorption studies. The sample composition corresponds to 31 wt. % Co(malen).

EXAMPLE 15

Co(TPP)/$Me_2Im$/$SiO_2$

Chloroform (15 ml) was added to a mixture of C°(TPP) (0.4032 g), $Me_2Im$ (0.1740 g), and $SiO_2$ (0.5098 g) then the solvent was allowed to evaporate. When the sample appeared dry, additional chloroform (10 ml) was added and slow evaporation was allowed to occur. The sample was dried under vacuum prior to sorption studies. The sample composition corresponds to 37 wt. % Co(TPP).

EXAMPLE 16

Co($T_{piv}$PP)/BzIm/PTMSP

PTMSP (0.10 g) was dissolved in chloroform (15 ml) with stirring for 2 h. A mixture containing Co($T_{piv}$PP) (0.10 g) and BzIm (0.027 g) was dissolved in chloroform (5 ml) then the two solutions were mixed. The combined solution was cast onto a teflon dish and the sample was covered to slow the evaporation rate. Upon drying, the sample was slowly placed under vacuum to remove residual volatile components. The purple membrane was used for sorption studies.

EXAMPLE 17

Co($T_{piv}$PP)/MeIm/PTMSP

PTMSP (0.30 g) was dissolved in chloroform (15 ml) with stirring for 3 h. Co($T_{piv}$PP) (0.25 g) in chloroform (5 ml) was added to the polymer solution, then MeIm (0.1 ml) was added by syringe. The combined solution was cast onto a teflon dish and the sample was covered to slow the evaporation rate. Upon drying, the sample was slowly placed under vacuum to remove residual volatile components. The purple membrane was used for sorption studies.

F. Gas Separation Applications

1. General

Supported TEC sorbents which are the subject of this invention are useful for gas separation applications. Equilibrium oxygen-selective sorbents of this type can be used either for bulk separation of oxygen-nitrogen containing mixtures (e.g. air), or can be used for purifications such as oxygen removal from low purity nitrogen or crude argon. The materials and/or conditions should be matched to a particular application based on the properties of the oxygen-selective TEC sites. For bulk separation of air, the oxygen affinity (frequently expressed as $P_{50}(O_2)$) under the operating conditions employed should be similar to the oxygen partial pressure in the feed so that significant oxygen binding occurs. The oxygen affinity of the TEC sites is a function of the donors (ligands) interacting with the transition metal ion in the deoxy form (equatorial and axial), the transition metal ion selected, structural effects in the vicinity of the oxygen interaction site together with conditions (e.g. temperature). The selection of each structural component can be inferred based on data available from solution and solid state studies either directly or by analogy and implication.

2. Examples of Sorption Performance

Sorption data for oxygen, nitrogen, and argon were obtained using a gravimetric method with pure gases. Sorption experiments were performed at 27° C. unless otherwise stated.

EXAMPLE 18

Co($T_{piv}$PP)/$DIM_6$/$SiO_2$, Simultaneous, 29 wt. % $SiO_2$, 58 wt. % Co($T_{piv}$PP) (0.54 mmol/g)

Sorption studies revealed that this material is oxygen-selective at equilibrium. Equilibrium and rate data are shown in Table 1 and Table 2, respectively. oxygen uptake to 2000 torr is 98% complete after 5 minutes, and release from 2000 torr is 95% complete within 30 minutes.

TABLE 1

SORPTION DATA FOR $DIm_6$/Co($T_{piv}$PP)/$SiO_2$ AT 27° C.

| Adsorbate | Step # | Pressure (torr) | Loading (mmol/g) | Approach (S or D) |
|---|---|---|---|---|
| $O_2$ | 8 | 125 | 0.108 | S |
| $O_2$ | 9 | 250 | 0.154 | S |
| $O_2$ | 10 | 375 | 0.181 | S |
| $O_2$ | 11 | 500 | 0.200 | S |
| $O_2$ | 12 | 750 | 0.226 | S |
| $O_2$ | 13 | 1000 | 0.249 | S |
| $O_2$ | 14 | 2000 | 0.301 | S |
| $O_2$ | 1 | 2000 | 0.295 | S |
| $O_2$ | 16 | 2000 | 0.317 | S |
| $N_2$ | 3 | 2000 | 0.025 | S |
| $N_2$ | 4 | 3779 | 0.042 | S |
| $N_2$ | 6 | 3779 | 0.042 | D |
| $N_2$ | 5 | 5000 | 0.057 | S |
| Ar | 18 | 1000 | 0.030 | S |
| Ar | 21 | 1000 | 0.028 | D |
| Ar | 20 | 1500 | 0.043 | D |
| Ar | 22 | 1500 | 0.041 | S |
| Ar | 19 | 2500 | 0.071 | S |

TABLE 2

SORPTION DATA FOR $DIm_6$/Co($T_{piv}$PP)/$SiO_2$ AT 27° C. DATA PRESENTED FOR UPTAKE TO 2000 TORR, AND RELEASE FROM 2000 TORR

| Time (minutes) | Sorption (mmol/g) | Desorption (mmol/g) |
|---|---|---|
| 0 | 0.003 | 0.317 |
| 1 | 0.241 | −0.041 |
| 2 | 0.283 | 0.052 |
| 3 | 0.301 | 0.060 |
| 4 | 0.309 | 0.057 |
| 5 | 0.312 | 0.055 |
| 10 | 0.314 | 0.039 |
| 15 | 0.317 | 0.032 |
| 20 | 0.317 | 0.026 |
| 30 | | 0.019 |
| 60 | | 0.008 |

TABLE 2-continued

SORPTION DATA FOR $DIm_6/Co(T_{piv}PP)/SiO_2$ AT 27° C.
DATA PRESENTED FOR UPTAKE TO 2000 TORR,
AND RELEASE FROM 2000 TORR

| Time (minutes) | Sorption (mmol/g) | Desorption (mmol/g) |
|---|---|---|
| 90 | | 0.003 |
| 120 | | 0.003 |

EXAMPLE 19

$Co(T_{piv}PP)/DIm_6/SiO_2$, Simultaneous, 29 wt. % $SiO_2$, 68 . % $Co(T_{piv}PP)$ (0.637 mmol/g)

Sorption studies revealed that this material is oxygen-selective at equilibrium. Equilibrium and rate data are shown in Table 3 and 4 respectively. Oxygen uptake to 1000 torr is 95% complete after 15 minutes, and release from 1000 torr is 85% complete within 60 minutes. The utilization of TEC sites is poor compared to the sample with higher $SiO_2$ content (Example 18).

TABLE 3

SORPTION DATA FOR $DIm_6/Co(T_{piv}PP)/SiO_2$ AT 27° C.

| Adsorbate | Step # | Pressure (torr) | Loading (mmol/g) | Approach (S or D) |
|---|---|---|---|---|
| $O_2$ | 5 | 125 | 0.128 | S |
| $O_2$ | 6 | 250 | 0.167 | S |
| $O_2$ | 7 | 375 | 0.190 | S |
| $O_2$ | 8 | 500 | 0.204 | S |
| $O_2$ | 9 | 750 | 0.223 | S |
| $O_2$ | 3 | 1000 | 0.236 | S |
| $O_2$ | 10 | 1000 | 0.238 | S |
| $O_2$ | 11 | 1500 | 0.258 | S |
| $O_2$ | 12 | 5000 | 0.313 | S |
| $O_2$ | 4 | 0 | 0.000 | D |
| $O_2$ | 13 | 0 | 0.000 | D |
| $N_2$ | 1 | 1000 | 0.011 | S |
| $N_2$ | 14 | 3779 | 0.009 | S |
| $N_2$ | 2 | 0 | 0.006 | D |
| $N_2$ | 15 | 0 | 0.000 | D |
| Ar | 16 | 1000 | 0.011 | S |
| Ar | 19 | 1000 | 0.009 | D |
| Ar | 18 | 1500 | 0.012 | D |
| Ar | 20 | 1500 | 0.011 | S |
| Ar | 17 | 2500 | 0.019 | S |
| Ar | 21 | 0 | 0.000 | D |

TABLE 4

SORPTION DATA FOR $DIm_6/Co(T_{piv}PP)/SiO_2$ AT 27° C.
DATA PRESENTED FOR UPTAKE TO 1000 TORR,
AND RELEASE FROM 1000 TORR

| Time (minutes) | Sorption (mmol/g) | Desorption (mmol/g) |
|---|---|---|
| 0 | 0.000 | 0.236 |
| 1 | 0.096 | 0.099 |
| 2 | 0.133 | 0.119 |
| 3 | 0.153 | 0.119 |
| 4 | 0.168 | 0.115 |
| 5 | 0.179 | 0.110 |
| 10 | 0.208 | 0.091 |
| 15 | 0.223 | 0.078 |
| 20 | 0.227 | 0.070 |
| 30 | 0.233 | 0.056 |
| 60 | 0.235 | 0.035 |
| 90 | 0.236 | 0.026 |
| 120 | | 0.020 |
| 150 | | 0.014 |
| 180 | | 0.013 |
| 210 | | 0.011 |

EXAMPLE 20

$Co(T_{piv}PP)/DIm_6$, 76 . % $Co(T_{piv}PP)$ (0.711 mmol/g)

Sorption studies revealed that this material is oxygen-selective at equilibrium. Equilibrium and rate data are shown in Table 5 and 6 respectively. Oxygen uptake to 1000 torr is 87% complete after 30 minutes, and release form 1000 torr is 73% complete after 120 minutes. The sample shows high oxygen loadings compared to supported samples (see Examples 18 and 19), but uptake and release rates are very slow. These slow rates demonstrate the need for thin supported layers.

TABLE 5

SORPTION DATA FOR $DIm_6/Co(T_{piv}PP)/SiO_2$ AT 27° C.

| Adsorbate | Step # | Pressure (torr) | Loading (mmol/g) | Approach (S or D) |
|---|---|---|---|---|
| $O_2$ | 30 | 125 | 0.285 | S |
| $O_2$ | 30 | 125 | 0.258 | S |
| $O_2$ | 14 | 250 | 0.351 | S |
| $O_2$ | 35 | 375 | 0.423 | S |
| $O_2$ | 35 | 375 | 0.402 | S |
| $O_2$ | 32 | 500 | 0.434 | S |
| $O_2$ | 37 | 750 | 0.496 | S |
| $O_2$ | 37 | 750 | 0.472 | S |
| $O_2$ | 20 | 2000 | 0.587 | S |
| $N_2$ | 1 | 3779 | 0.029 | S |
| $N_2$ | 3 | 3779 | 0.033 | D |
| Ar | 5 | 1000 | 0.014 | S |
| Ar | 8 | 1000 | 0.015 | D |
| Ar | 9 | 1500 | 0.022 | S |
| Ar | 7 | 1500 | 0.022 | D |

TABLE 6

SORPTION DATA FOR $DIm_6/CoT_{piv}PP)$ AT 27° C. (15,749-12)
DATA PRESENTED FOR UPTAKE AND RELEASE FOR 2000 TORR

| Time (minutes) | Sorption (mmol/g) | Desorption (mmol/g) |
|---|---|---|
| 0 | 0.001 | 0.573 |
| 1 | 0.140 | 0.408 |
| 2 | 0.212 | 0.420 |
| 3 | 0.259 | 0.417 |
| 4 | 0.293 | 0.409 |
| 5 | 0.319 | 0.402 |
| 10 | 0.400 | 0.367 |
| 15 | 0.443 | 0.340 |
| 20 | 0.468 | 0.318 |
| 30 | 0.500 | 0.285 |
| 60 | 0.537 | 0.223 |
| 90 | 0.550 | 0.184 |
| 120 | 0.558 | 0.157 |
| 150 | 0.563 | |
| 180 | 0.564 | |
| 210 | 0.569 | |

TABLE 6-continued

SORPTION DATA FOR DIm$_6$/CoT$_{piv}$PP) AT 27° C. (15,749-12)
DATA PRESENTED FOR UPTAKE AND RELEASE FOR 2000 TORR

| Time (minutes) | Sorption (mmol/g) | Desorption (mmol/g) |
|---|---|---|
| 240 | 0.570 | |
| 270 | 0.572 | |

EXAMPLE 21

Co(T$_{piv}$PP)/DIm$_6$/SiO$_2$, Sequential, 23.8 wt. % Co (T$_{piv}$PP) (0.293 mmol/g)

Sorption studies revealed that this material is oxygen-selective at equilibrium. Equilibrium and rate data are shown in Table 7 and 8, respectively. Oxygen uptake to 1000 torr is 93% complete after 1 minute, and release from 1000 torr is 95% complete after 2 minutes. The observed rates are fast compared to samples prepared using simultaneous methods (see Examples 18, 19, and 20) but equilibrium oxygen loadings are lower (reflects lower TEC contents). The fast rates support organization of the TEC coating into thin oriented layers.

TABLE 7

SORPTION DATA FOR DIm$_6$/SiO$_2$/Co(T$_{piv}$PP) AT 27° C.

| Adsorbate | Step # | Pressure (torr) | Loading (mmol/g) | Approach (S or D) |
|---|---|---|---|---|
| O$_2$ | 5 | 125 | 0.072 | S |
| O$_2$ | 6 | 250 | 0.094 | S |
| O$_2$ | 7 | 375 | 0.109 | S |
| O$_2$ | 8 | 500 | 0.120 | S |
| O$_2$ | 16 | 500 | 0.126 | D |
| O$_2$ | 9 | 750 | 0.135 | S |
| O$_2$ | 1 | 1000 | 0.148 | S |
| O$_2$ | 10 | 1000 | 0.147 | S |
| O$_2$ | 15 | 1000 | 0.152 | D |
| O$_2$ | 11 | 1500 | 0.165 | S |
| O$_2$ | 12 | 2000 | 0.180 | S |
| O$_2$ | 13 | 3000 | 0.206 | S |
| O$_2$ | 14 | 4000 | 0.229 | S |
| N$_2$ | 3 | 1000 | 0.014 | S |
| N$_2$ | 18 | 1000 | 0.018 | S |
| N$_2$ | 22 | 1000 | 0.018 | D |
| N$_2$ | 19 | 3779 | 0.051 | S |
| N$_2$ | 21 | 3779 | 0.050 | D |
| Ar | 24 | 1000 | 0.019 | S |
| Ar | 27 | 1000 | 0.020 | D |
| Ar | 28 | 1500 | 0.028 | S |
| Ar | 26 | 1500 | 0.028 | D |
| Ar | 25 | 2500 | 0.044 | S |

TABLE 8

SORPTION DATA FOR DIm$_6$/SiO$_2$/Co(T$_{piv}$PP) AT 27° C.
DATA PRESENTED FOR UPTAKE FOR 1000 TORR,
AND RELEASE FROM 1000 TORR

| Time (minutes) | Sorption (mmol/g) | Desorption (mmol/g) |
|---|---|---|
| 0 | 0.000 | 0.148 |
| 1 | 0.137 | −0.005 |
| 2 | 0.138 | 0.008 |
| 3 | 0.140 | 0.008 |
| 4 | 0.143 | 0.006 |
| 5 | 0.143 | 0.006 |
| 10 | 0.146 | 0.006 |
| 15 | 0.146 | 0.005 |

TABLE 8-continued

SORPTION DATA FOR DIm$_6$/SiO$_2$/Co(T$_{piv}$PP) AT 27° C.
DATA PRESENTED FOR UPTAKE FOR 1000 TORR,
AND RELEASE FROM 1000 TORR

| Time (minutes) | Sorption (mmol/g) | Desorption (mmol/g) |
|---|---|---|
| 20 | 0.147 | 0.005 |
| 30 | 0.147 | 0.005 |
| 60 | 0.148 | 0.006 |
| 72 | | 0.006 |

EXAMPLE 22

Co(T$_{piv}$PP)/DPy$_6$/SiO$_2$, Sequential, 34.8 wt. % Co (T$_{piv}$PP) (0.326 mmol/g)

Sorption studies revealed that this material is oxygen-selective at equilibrium. Equilibrium and rate data are shown in Table 9 and 10 respectively. Oxygen uptake to 1000 torr is 93% complete after 1 minute, and release from 1000 torr is 98% complete after 2 minutes. The observed rates are fast compared to samples prepared using a simultaneous methods (see Examples 18, 19, and 20) and are similar to a related sample containing DIm$_6$ but the oxygen binding equilibrium constant for TEC sites is shifted to higher pressures relative to the DIm$_6$, material (see Example 21).

TABLE 9

SORPTION DATA FOR DPy$_6$/Co(T$_{piv}$PP)/SiO$_2$ AT 27° C.

| Adsorbate | Step # | Pressure (torr) | Loading (mmol/g) | Approach (S or D) |
|---|---|---|---|---|
| N$_2$ | 1 | 1000 | 0.004 | S |
| N$_2$ | 2 | 3779 | 0.013 | S |
| N$_2$ | 3 | 5000 | 0.014 | S |
| N$_2$ | 4 | 3779 | 0.010 | D |
| N$_2$ | 5 | 1000 | 0.006 | D |
| N$_2$ | 6 | 0 | 0.003 | D |
| O$_2$ | 7 | 250 | 0.045 | S |
| O$_2$ | 8 | 500 | 0.066 | S |
| O$_2$ | 9 | 1000 | 0.092 | S |
| O$_2$ | 1' | 1000 | 0.093 | S |
| O$_2$ | 10 | 1500 | 0.109 | S |
| O$_2$ | 11 | 2000 | 0.124 | S |
| O$_2$ | 12 | 2500 | 0.135 | S |
| O$_2$ | 13 | 3000 | 0.144 | S |
| O$_2$ | 14 | 5000 | 0.174 | S |
| O$_2$ | 15 | 1000 | 0.096 | D |
| O$_2$ | 16 | 0 | −0.001 | D |
| O$_2$ | 2' | 0 | 0.003 | D |
| Ar | 3' | 1000 | 0.007 | S |
| Ar | 4' | 2500 | 0.016 | S |
| Ar | 5' | 1500 | 0.013 | D |
| Ar | 6' | 1000 | 0.010 | D |
| Ar | 7' | 1500 | 0.015 | S |
| Ar | 8' | 0 | 0.006 | D |

TABLE 10

Oxygen Binding Kinetics for DPy$_6$/Co(T$_{piv}$PP)/SiO$_2$ at 27° C.
Uptake and Release for 1000 torr

| Time (minutes) | Sorption (mmol/g) | Desorption (mmol/g) |
|---|---|---|
| 0 | 0.002 | 0.093 |
| 1 | 0.086 | −0.012 |
| 2 | 0.089 | 0.002 |
| 3 | 0.090 | 0.000 |

TABLE 10-continued

Oxygen Binding Kinetics for $DPy_6/Co(T_{piv}PP)/SiO_2$ at 27° C.
Uptake and Release for 1000 torr

| Time (minutes) | Sorption (mmol/g) | Desorption (mmol/g) |
|---|---|---|
| 4 | 0.092 | 0.005 |
| 5 | 0.092 | 0.003 |
| 10 | 0.092 | 0.003 |
| 15 | 0.092 | 0.003 |
| 20 | 0.092 | 0.003 |
| 30 |  | 0.002 |
| 60 |  | 0.003 |

EXAMPLE 23

$Co(T_{piv}PP)/BzIm/dense$ 50 Å $SiO_2$, Small Particles, 21 wt. % $SiO_2$,

This example describes a superior performing TEC-supported small particle sample. The sample is comprised of a $Co(T_{piv}PP)/BzIm$ coating on 50 Å diameter $SiO_2$ small particles using 21 wt. % $SiO_2$. The sorption behavior for this sample is characterized by high $O_2$ loadings, fast uptake and release rates, and high selectivities for oxygen over nitrogen. The isotherm data are tabulated in Table 11. Uptake of $O_2$ to 1000 torr is 97% complete after 5 minutes and $O_2$ release from 1000 torr is 95% complete in 15 minutes. The $O_2$ loading vs. time data for this sample are tabulated in Table 12.

TABLE 11

$BzIm/Co(T_{piv}PP)$ on $SiO_2$
Loading vs. Pressure
21 wt. % $SiO_2$

| Pressure (torr) | $O_2$ Loading (mmol/g) | $N_2$ Loading (mmol/g) | Ar Loading (mmol/g) |
|---|---|---|---|
| 0 | 0.000 | 0.000 | 0.000 |
| 100 | 0.188 |  |  |
| 250 | 0.296 |  |  |
| 500 | 0.383 |  |  |
| 1000 | 0.421 |  |  |
| 2000 | 0.468 | 0.010 | 0.008 |
| 3000 | 0.489 |  |  |
| 3779 |  | 0.005 |  |
| 4500 | 0.517 |  |  |

TABLE 12

$O_2$ Uptake and Release data to and From 1000 Torr
$BzIm/Co(T_{piv}PP)$ on $SiO_2$
21 wt. % $SiO_2$

| Time (minutes) | $O_2$ Loading - Uptake to 1000 Torr (mmol/g) | $O_2$ Loading - Release From 1000 Torr (mmol/g) |
|---|---|---|
| 0 | 0.001 | 0.415 |
| 1 | 0.355 | -0.016 |
| 2 | 0.382 | 0.047 |
| 3 | 0.392 | 0.050 |
| 4 | 0.398 | 0.047 |
| 5 | 0.401 | 0.044 |
| 10 | 0.409 | 0.030 |
| 15 | 0.411 | 0.020 |
| 20 | 0.412 | 0.019 |
| 30 | 0.413 | 0.016 |

TABLE 12-continued $O_2$ Uptake and Release data to and From 1000 Torr
$BzIm/Co(T_{piv}PP)$ on $SiO_2$
21 wt. % $SiO_2$

| Time (minutes) | $O_2$ Loading - Uptake to 1000 Torr (mmol/g) | $O_2$ Loading - Release From 1000 Torr (mmol/g) |
|---|---|---|
| 36 | 0.415 |  |
| 53 |  | 0.014 |

EXAMPLE 24

$Co(T_{piv}PP)/BzIm/dense$ 50 Å $SiO_2$ Small Particles, 8 wt. % $SiO_2$,

This example shows the advantage of using thin layers of $Co(T_{piv}PP)/BzIm$ coatings on small particle supports. In this experiment, two samples were prepared which contained the same amounts of the two coating components, $Co(T_{piv}PP)$ and BzIm, but different amounts of $SiO_2$ which resulted in a different thickness of TEC coating for each sample. The first sample, comprised of 8 wt. % $SiO_2$, had a thick TEC coating relative to that of the second sample, comprised of 21 wt. % $SiO_2$ (see Example 23). The 8 wt. % $SiO_2$ sample (thick coating) shows a lower $O_2$ loadings than the 21 wt. % $SiO_2$ sample (thin coating). Loading data for the 8 wt. % $SiO_2$ are tabulated in Table 13. The lower loadings observed for this sample are probably a result of the poor accessibility of the TEC to $O_2$ due to diffusion constraints imparted by the thicker coating. This argument is also supported by the lower rates observed for the 8 wt. % $SiO_2$ sample compared to those of the 21 wt. % sample. A comparison of these two samples (Table 14) shows the uptake of $O_2$ to 1000 torr is only 83% complete after 5 minutes for the 8 wt. % $SiO_2$ sample, but 97% complete for the 21 wt. % sample. $O_2$ release rates from 1000 torr follow a similar trend: the release process is only 82% complete after 20 minutes for the 8 wt. % $SiO_2$ sample, but 95% complete for the 21 wt. % sample. The $O_2$ loading vs. time data for this sample are given in Table 15.

TABLE 13

$BzIm/Co(T_{piv}PP)$ on $SiO_2$
Loading vs. Pressure
8 wt. % $SiO_2$

| Pressure (torr) | $O_2$ Loading (mmol/g) | $N_2$ Loading (mmol/g) | Ar Loading (mmol/g) |
|---|---|---|---|
| 0 | 0.000 | 0.000 | 0.000 |
| 200 | 0.080 | 0.002 |  |
| 500 | 0.124 |  | 0.003 |
| 1000 | 0.162 |  |  |
| 1691 |  | 0.003 | 0.008 |
| 2000 | 0.199 |  |  |
| 3000 | 0.233 | 0.003 |  |
| 4500 | 0.245 | 0.003 | 0.019 |

TABLE 14

Comparison of % $O_2$ Uptake and Release for BzIm/Co($T_{piv}$PP) on $SiO_2$
8 and 21 wt. % $SiO_2$ Samples

| Time (min) | 21 wt. % $SiO_2$ % $O_2$ Uptake | 8 wt. % $SiO_2$ % $O_2$ Uptake | 21 wt. % $SiO_2$ % $O_2$ Release | 8 wt. % $SiO_2$ % $O_2$ Release |
|---|---|---|---|---|
| 0 | 0 | 0 | 100 | 100 |
| 3 | 94 | 76 | 88 | 68 |
| 5 | 97 | 83 | 89 | 71 |
| 10 | 98 | 89 | 93 | 76 |
| 20 | 99 | 95 | 95 | 82 |
| 30 |  | 97 |  | 85 |
| 60 |  |  |  | 89 |
| 90 |  |  |  | 91 |

TABLE 15

$O_2$ Uptake and Release Data to and From 1000 Torr
BzIm/Co($T_{piv}$PP) on $SiO_2$
8 wt. % $SiO_2$

| Time (minutes) | $O_2$ Loading - Uptake to 1000 Torr (mmol/g) | $O_2$ Loading - Release From 1000 Torr (mmol/g) |
|---|---|---|
| 0 | 0.001 | 0.161 |
| 1 | 0.098 | 0.042 |
| 2 | 0.115 | 0.052 |
| 3 | 0.123 | 0.052 |
| 4 | 0.129 | 0.049 |
| 5 | 0.133 | 0.047 |
| 10 | 0.144 | 0.038 |
| 15 | 0.149 | 0.032 |
| 20 | 0.153 | 0.029 |
| 30 | 0.157 | 0.024 |
| 49 | 0.161 |  |
| 60 |  | 0.017 |
| 90 |  | 0.015 |
| 120 |  | 0.014 |
| 150 |  | 0.014 |
| 166 |  | 0.014 |

EXAMPLE 25

Unsupported Co($T_{piv}$PP)/BzIm

This example illustrates the benefits of using small particle supports in improving TEC performance. In this experiment, the sorption behavior of three samples were compared: 1) a Co($T_{piv}$PP)/BzIm/$SiO_2$ sample using 21 wt. % $SiO_2$ (see Example 23), 2) a Co($T_{piv}$PP)/BzIm/$SiO_2$ sample using 8 wt. % $SiO_2$ (see Example 24), and 3) a Co($T_{piv}$PP)/BzIm sample which was unsupported. A comparison of the $O_2$ isotherms for the three samples illustrates that the loading of Co($T_{piv}$PP) is not improved using an 8 wt. % $SiO_2$ support. However, a substantial improvement in loading can be seen at the 21 wt. % $SiO_2$ level. The sorption data for the unsupported BzIm/Co($T_{piv}$PP) sample is given in Table 16. Improvements in the percent utilization of Co($T_{piv}$PP) can be achieved by using small particle supports. The percent utilization of Co($T_{piv}$PP) increased from 24% in the unsupported sample to 71% in the 21 wt. % $SiO_2$ sample, as shown in Table 17. Lastly, improvements in $O_2$ uptake and release rates of Co($T_{piv}$PP)/BzIm can be achieved by using small particle supports. The uptake and release of $O_2$ is slow for the Co($T_{piv}$PP)/BzIm sample, but increases for the 8 and 21 wt. % $SiO_2$ samples, as shown in Table 18. The $O_2$ loading vs. time data for the unsupported sample are given in Table 19.

TABLE 16

BzIm/Co($T_{piv}$PP) Unsupported
Loading vs. Pressure

| Pressure (torr) | $O_2$ Loading (mmol/g) | $N_2$ Loading (mmol/g) | Ar Loading (mmol/g) |
|---|---|---|---|
| 0 | 0.000 | 0.000 | 0.000 |
| 200 | 0.079 |  |  |
| 500 | 0.125 | 0.003 | 0.004 |
| 1000 | 0.164 |  |  |
| 1691 |  | 0.003 | 0.009 |
| 2000 | 0.201 |  |  |
| 3000 | 0.224 |  |  |
| 4500 | 0.247 | 0.004 | 0.017 |

TABLE 17

Percent Utilization of Co($T_{piv}$PP) in BzIm/Co($T_{piv}$PP),
Unsupported and on $SiO_2$

| $SiO_2$ Content | % Utilization of Co($T_{piv}$PP) |
|---|---|
| 0% | 24 |
| 8% | 27 |
| 21% | 71 |

TABLE 18

Comparison of % $O_2$ Uptake and Release for
BzIm/Co($T_{piv}$PP)
Unsupported and on $SiO_2$

| Time (min) | 21 wt % $SiO_2$ % $O_2$ Uptake | 8 wt. % $SiO_2$ % $O_2$ Uptake | Unsupported % $O_2$ Uptake | 21 wt. % $SiO_2$ % $O_2$ Release | 8 wt. % $SiO_2$ % $O_2$ Release | Unsupported % $O_2$ Release |
|---|---|---|---|---|---|---|
| 0 | 0 | 0 | 0 | 100 | 100 | 100 |
| 3 | 94 | 76 | 59 | 88 | 68 | 51 |
| 5 | 97 | 83 | 67 | 89 | 71 | 54 |
| 10 | 98 | 89 | 77 | 93 | 76 | 61 |
| 20 | 99 | 95 | 86 | 95 | 82 | 68 |
| 30 |  | 97 | 90 |  | 85 | 73 |
| 60 |  |  | 96 |  | 89 | 79 |
| 90 |  |  | 100 |  | 91 | 83 |

TABLE 19

$O_2$ Uptake and Release Data to and From 1000 Torr
BzIm/Co($T_{piv}$PP) Unsupported

| Time (minutes) | $O_2$ Loading - Uptake to 1000 Torr (mmol/g) | $O_2$ Loading - Release From 1000 Torr (mmol/g) |
|---|---|---|
| 0 | 0.000 | 0.160 |
| 1 | 0.071 | 0.073 |
| 2 | 0.086 | 0.081 |
| 3 | 0.095 | 0.078 |
| 4 | 0.102 | 0.076 |
| 5 | 0.108 | 0.074 |
| 10 | 0.123 | 0.062 |
| 15 | 0.132 | 0.056 |
| 20 | 0.137 | 0.051 |
| 30 | 0.144 | 0.043 |
| 60 | 0.154 | 0.033 |
| 90 | 0.160 | 0.027 |
| 100 | 0.160 |  |
| 120 |  | 0.024 |
| 150 |  | 0.022 |

TABLE 19-continued

O₂ Uptake and Release Data to and From 1000 Torr
BzIm/Co(T$_{piv}$PP) Unsupported

| Time (minutes) | O₂ Loading - Uptake to 1000 Torr (mmol/g) | O₂ Loading - Release From 1000 Torr (mmol/g) |
|---|---|---|
| 180 | | 0.020 |
| 200 | | 0.019 |

It will be understood that various changes can be made in the details of the invention without departing from the scope of the invention as recited in the appended claims.

1. Composition

The composition of the supported TEC can be varied by substitution of the supports, i.e. composition and configuration, the TEC; and, if used, the linking agent or exogenous Lewis base. Criteria for selecting supports are based primarily on surface area. The range of TEC's includes all such materials that interact reversibly with oxygen in either solution or solid embodiments. It will be understood that various changes and modifications can be made with respect to metal ions, ligands and axial bases used in the TEC's of the invention. Sorbents using Cr(II) or Pt(II) and other transition metal ions that can react reversibly with oxygen can be employed. Similarly, axial bases, such as oxygen-sulfur-containing hetrocycles, ethers, thioethers or amines can be used in addition to those previously mentioned.

The range of TEC's includes TEC's based on chelating ligands such as pentadentate or tetradentate systems. Under the application conditions for the supported TEC, the transition element site should exist in a five coordinate state in the absence of oxygen. For TEC's based on tetradentate ligands, this is conveniently accomplished by coordination in an axial sense using a Lewis base which can be derived from either the support surface, the linking agent, or can be part of an additional component.

2. Preparation

The preparation of TEC coated substrates has been performed by a number of methods including solvent evaporation of particle slurries and casting methods for materials based on porous, soluble polymers. For non-soluble substrates, other isolation procedures are applicable including filtration and centrifugation. In addition, column-based loading methods should be included where a solution containing the oxygen-selective coating material is allowed to pass through a bed containing the substrate. Other coating methods should also be included such as chemical vapor deposition (for TEC and/or other components).

3. Conditions and Applications

As previously noted, oxygen-selective sorbents can be applied to either bulk separation or purification processes. The conditions which are employed for these processes is an important variable. Since the basis of the selectivity is an equilibrium process with negative enthalpy, operation at different temperatures can be used to match performance characteristics to a particular application. In addition, the sorption and release of oxygen will respond to changes in either pressure (or partial pressure) or temperature. In addition to operating conditions, structural variations can be used to give desirable oxygen affinities ($P_{50}(O_2)$), oxygenation enthalpies ($\Delta H\ O_2$)), and uptake/release rates including changes in the nature of the TEC and the axial donor (Lewis base).

The supported TEC's based on small particle substrates can be used in a number of ways. The application of TEC's supported on small particles can be extended to include assemblies attached to heat exchanger surfaces or compacted into porous polymers. In addition, assemblies of TEC coated small particles can be applied to membrane gas separation processes. Possible configurations include TEC coated small particles embedded into dense or microporous polymeric matrices. Microporous membranes based on TEC coated small particles are expected to show high oxygen permeation selectivities due to selective surface diffusion. The permeation selectivity will be dependent on a number of factors including the free pore diameter (a function of mean particle size and distribution), the spacing of TEC sites, the surface diffusion coefficient of oxygen, and the oxygen interaction characteristics of the TEC coating (site uptake and release rates, energetics).

To this point, the use of supported TEC's has been described to take advantage of an oxygen selectivity. However, the use of alternative TEC's can provide the basis for alternative small molecule separations. The minimum performance criteria and methods to achieve them remain the same, but the TEC component should be substituted for examples appropriate to the desired separation in solution or solid state embodiments.

The invention provides highly desirable oxygen-selective sorbents incorporating supported TEC's in the solid phase capable of enhanced utilization and sorption rates. Thus, the sorbents of the invention are highly advantageous for practical commercial operations.

We claim:

1. A process for selectively adsorbing oxygen from an oxygen containing gas stream which comprises contacting said gas stream with an oxygen-selective sorbent having an oxygen loading capacity greater than about 0.3 mmol per gram of sorbent, and with oxygen sorption uptake rates greater than about 0.3 mmol oxygen per gram of sorbent per minute, said sorbent comprising:

(a) a transition element complex comprising ligands complexed to a transition element ion embedded therein an axial base which is exogenous or endogenous of said ligand, said ligand, transition element ion and said axial base being selected such that said transition element complex is in the solid phase, is equilibrium oxygen-selective, and reacts reversibly with oxygen; and (b) a substrate having a nitrogen BET surface area greater than about 300 square meters per gram and less than about 500 square meters per gram comprising non-zeolitic crystalline or non-crystalline solid, with the solid transition element complex being supported thereon, said transition element complex being spaced such that the complexed transition element ion is accessible to an oxygen-containing gas stream upon contact of said gas stream with the oxygen-selective sorbent.

2. The process of claim 1, wherein said gas stream comprises air.

3. The process of claim 2, wherein said oxygen-selective sorbent further includes a linking agent having at least one site for interaction with said substrate and at least one site for interaction with said transition element complex, with said transition element complex being dispersed as a monolayer on said substrate.

4. The process of claim 3, wherein said linking agent is a polyfunctional linking agent with multiple sites for interaction thereof with said transition element complex.

5. The process of claim 3, wherein said transition element complex comprises (1) a metal selected from the group consisting of Co(II), Ni(II), Fe(II), Mn(II), Ru(II), Ru(III), Cu(I), Rh(III), Cr(II) or Pt(II); (2) a ligand comprising at least one of porphyrins, Schiff bases, polyamines, polyoxoamines, oximes or cyclidenes and (3) an axial base comprising nitrogen heterocycles, sulfur heterocycles or oxygen heterocycles, ethers, thioethers and amines.

6. The process of claim 2, wherein said transition element complex comprises (1) a metal ion selected from the group consisting of Co(II), Fe(II), Ni(II), Mn(II), Ru(II), Ru(III), Cu(II), Rh(III), Cr(III), or Pt(II); (2) a ligand comprising at least one of porphyrins, Schiff bases, polyamines, polyoxoamides, oximes, derivatives thereof, or cyclidenes; and (3) an axial base comprising nitrogen heterocycles, sulfur heterocycles, or oxygen heterocycles, ethers, thioethers, amines and derivatives thereof.

7. The process of claim 6, wherein said (1) metal ion is cobalt (II); (2) said ligand comprises at least one of picket-fence porphyrin or their dianions; at least one of low molecular weight malen, salen and their Schiff bases or tetrazaannulene; and (3) said axial base comprises N-substituted imidazole or at least one of 3- or 4-substituted pyridine.

8. The process of claim 7, wherein said axial base comprises N-substituted imidazole.

9. The process of claim 2, wherein said substrate comprises particles having a particle size of less than about 100 Å.

10. The process of claim 2, wherein said substrate comprises an inorganic support.

11. The process of claim 10, wherein said inorganic support comprises a single oxide, mixed oxide or carbon particles.

12. The process of claim 10, wherein said transition element complex is cobalt (II).

13. The process of claim 12, wherein said ligand comprises at least one of picket-fence porphyrin or their porphyrin dianions.

14. The process of claim 2, wherein said transition element complex is dispersed as multilayers on or within the substrate.

* * * * *